(12) United States Patent
Sakano

(10) Patent No.: US 12,556,841 B2
(45) Date of Patent: Feb. 17, 2026

(54) IMAGING SENSOR AND IMAGING DEVICE

(71) Applicant: SONY SEMICONDUCTOR SOLUTIONS CORPORATION, Kanagawa (JP)

(72) Inventor: Yorito Sakano, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 182 days.

(21) Appl. No.: 18/550,720

(22) PCT Filed: Feb. 4, 2022

(86) PCT No.: PCT/JP2022/004399
§ 371 (c)(1),
(2) Date: Sep. 15, 2023

(87) PCT Pub. No.: WO2022/201898
PCT Pub. Date: Sep. 29, 2022

(65) Prior Publication Data
US 2024/0155267 A1    May 9, 2024

(30) Foreign Application Priority Data
Mar. 25, 2021  (JP) .................................. 2021-052123

(51) Int. Cl.
*H04N 25/771* (2023.01)
*H04N 25/585* (2023.01)
(Continued)

(52) U.S. Cl.
CPC ........... *H04N 25/771* (2023.01); *H04N 25/59* (2023.01); *H10F 39/8037* (2025.01); *H04N 25/62* (2023.01)

(58) Field of Classification Search
CPC ...... H04N 25/59; H04N 25/771; H04N 25/62; H04N 25/585; H04N 25/589;
(Continued)

(56) References Cited

U.S. PATENT DOCUMENTS 10,602,088 B2 * 3/2020 Gomi ................... H04N 25/771
11,722,793 B2 * 8/2023 Kumagai .............. H10F 39/813
(Continued)

FOREIGN PATENT DOCUMENTS

| JP | 2005-328493 | 11/2005 |
| JP | 2020-021987 | 2/2020 |
| WO | WO 2018/221261 | 12/2018 |

OTHER PUBLICATIONS

International Search Report and Written Opinion prepared by the Japan Patent Office on Apr. 1, 2022, for International Application No. PCT/JP2022/004399, 2 pgs.

*Primary Examiner* — Marly S Camargo
(74) *Attorney, Agent, or Firm* — Sheridan Ross PC

(57) ABSTRACT

An imaging sensor according to an embodiment includes a pixel (100b) including a first light receiving element (20L) and a second light receiving element (20S) that generate and accumulate photocharges through photoelectric conversion according to received light, and an interpixel capacitance that accumulates photocharges overflowed from the first light receiving element and the second light receiving element during an exposure period. The second light receiving element has a sensitivity to light lower than a sensitivity to light of the first light receiving element.

10 Claims, 24 Drawing Sheets

(51) Int. Cl.
    *H04N 25/589*     (2023.01)
    *H04N 25/59*     (2023.01)
    *H04N 25/62*     (2023.01)
    *H04N 25/778*     (2023.01)
    *H10F 39/00*     (2025.01)

(58) Field of Classification Search
    CPC .............. H04N 25/778; H10F 39/8037; H10F 39/1865; H10F 39/803
    See application file for complete search history.

(56) References Cited

U.S. PATENT DOCUMENTS

| | | | |
|---|---|---|---|
| 2010/0060762 A1* | 3/2010 | Takada | H10F 39/802 348/300 |
| 2020/0186732 A1 | 6/2020 | Takizawa et al. | |
| 2021/0044771 A1* | 2/2021 | Kwag | G01J 1/44 |
| 2021/0266476 A1* | 8/2021 | Kumagai | H10F 39/813 |
| 2022/0053151 A1* | 2/2022 | Hwang | H04N 25/771 |

* cited by examiner

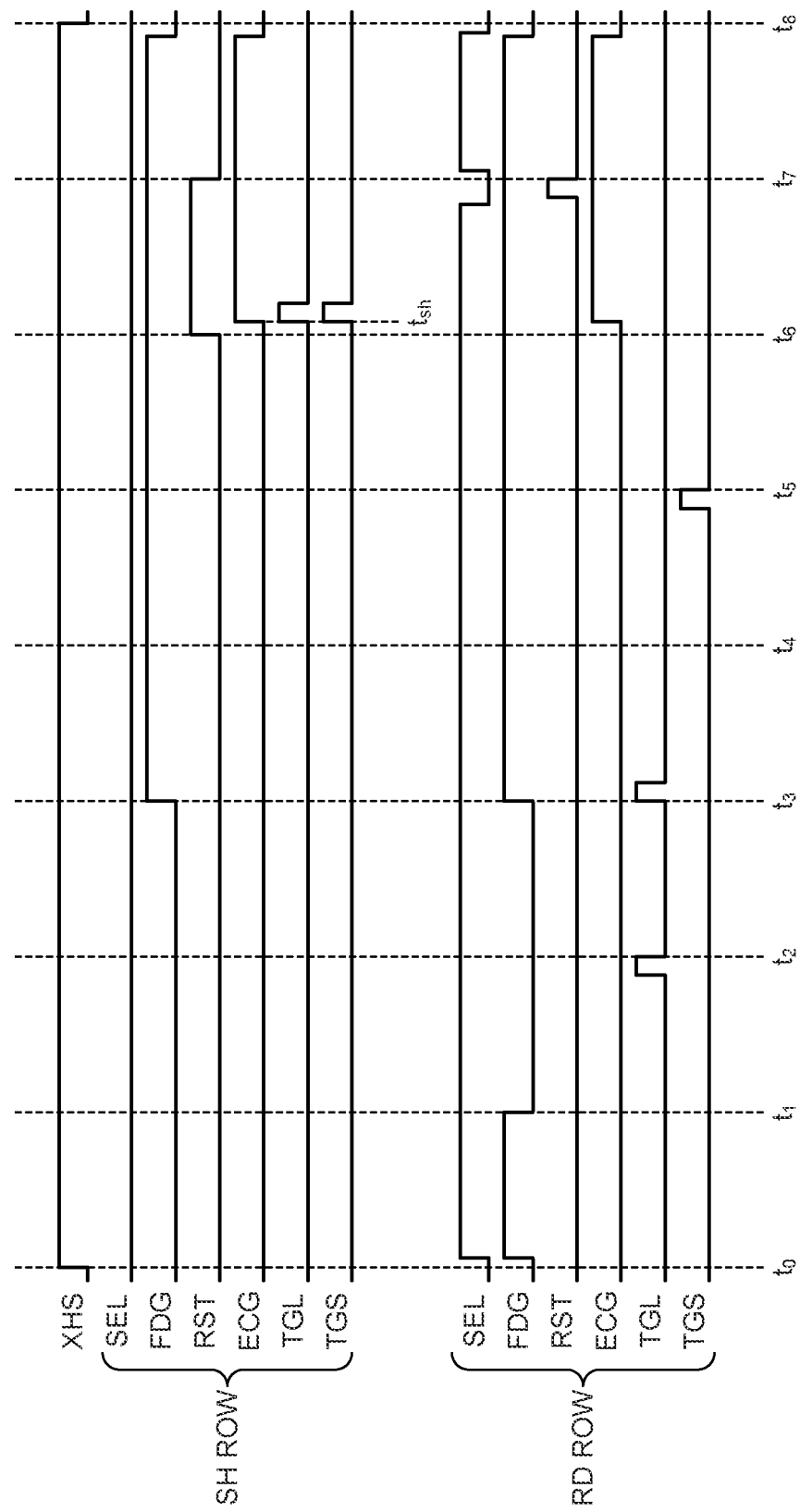

FIG.8B
(a) 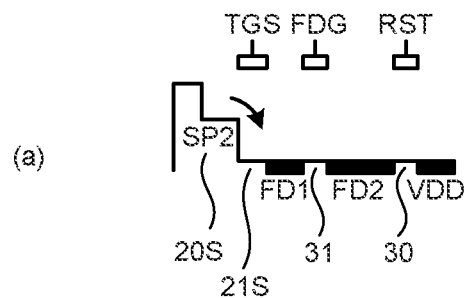
(b) 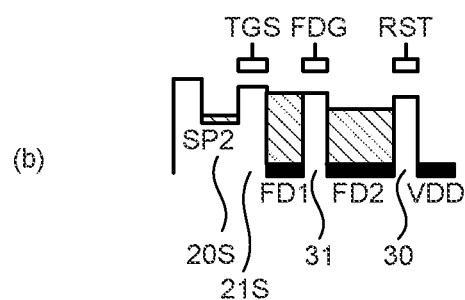
(c) 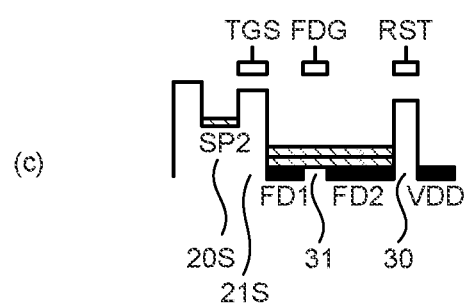
(d) 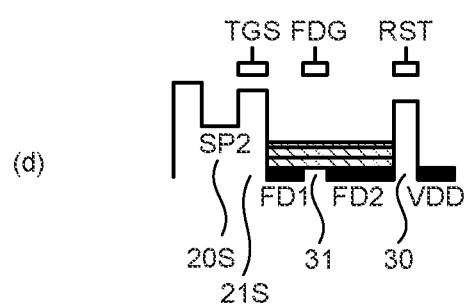

FIG.8C
(a)
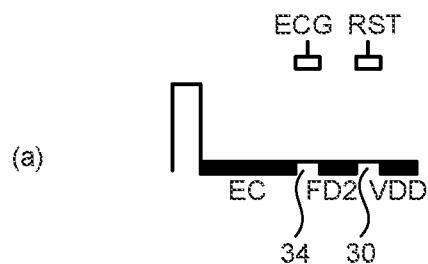
(b)
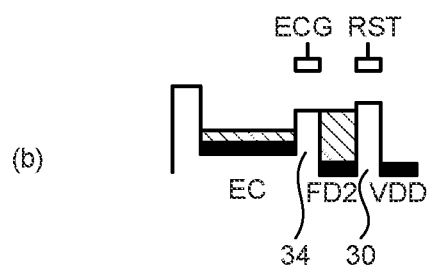
(c)
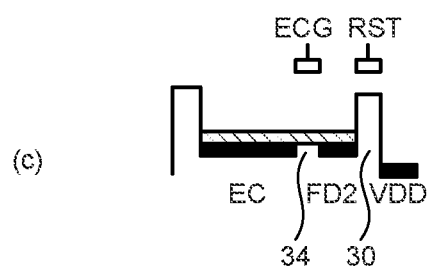
(d)
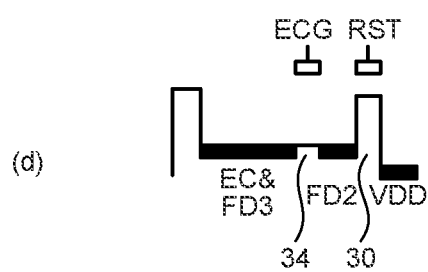

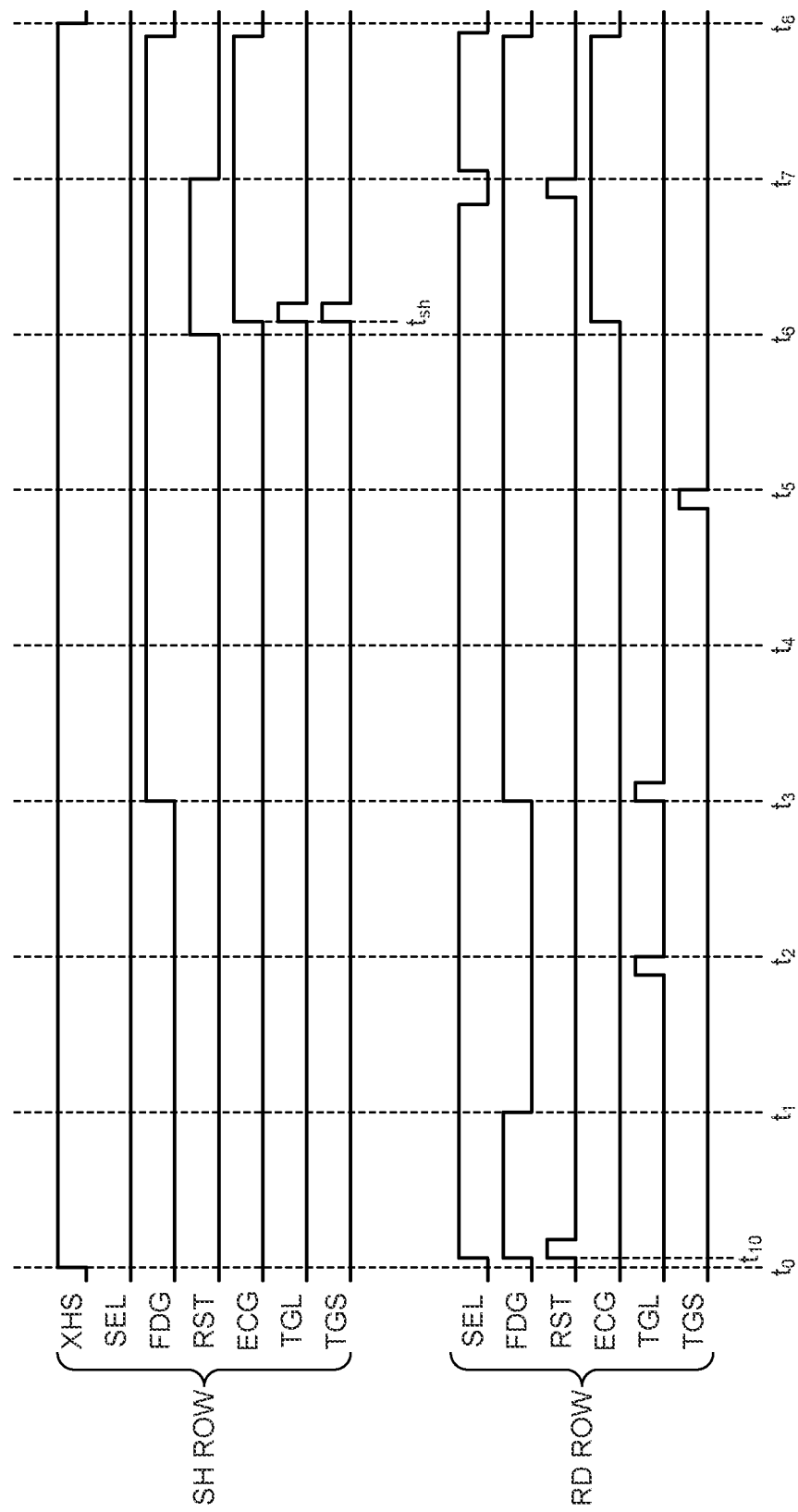

FIG.15B
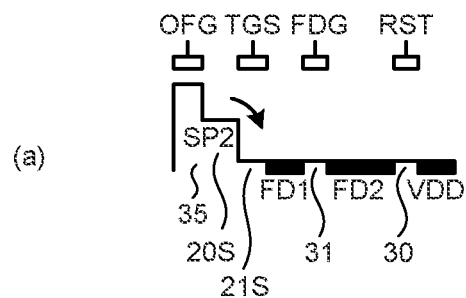
(a)
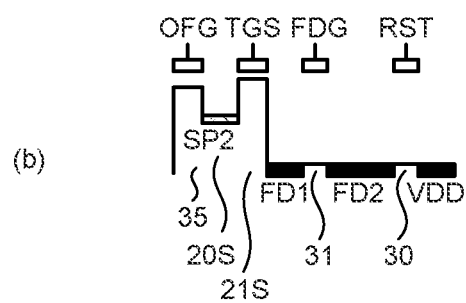
(b)
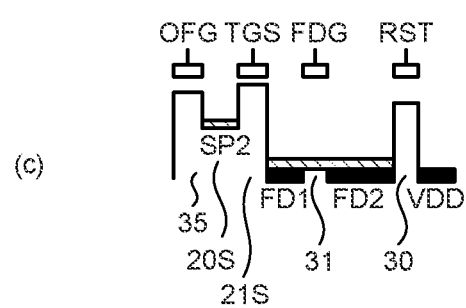
(c)
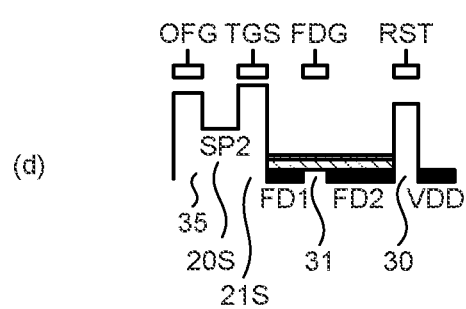
(d)

FIG.15C
(a) 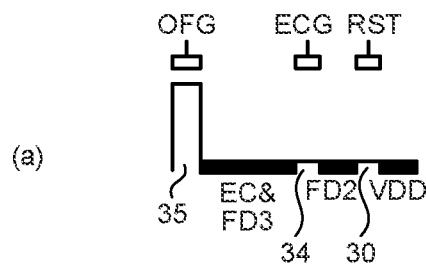
(b) 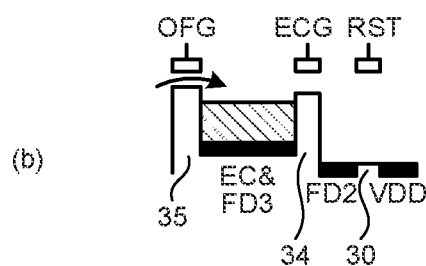
(c) 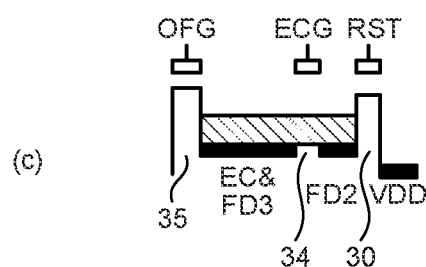
(d) 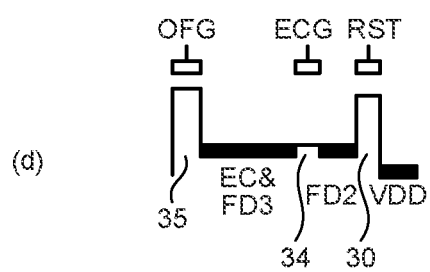

IMAGING SENSOR AND IMAGING DEVICE

CROSS REFERENCE TO RELATED APPLICATIONS

This application is a national stage application under 35 U.S.C. 371 and claims the benefit of PCT Application No. PCT/JP2022/004399, having an international filing date of 4 Feb. 2022, which designated the United States, which PCT application claimed the benefit of Japanese Patent Application No. 2021-052123, filed 25 Mar. 2021, the entire disclosures of each of which are incorporated herein by reference.

FIELD

The present disclosure relates to an imaging sensor and an imaging device.

BACKGROUND

Imaging sensors using a light receiving element such as a photodiode that converts incident light into a voltage through photoelectric conversion and outputs the voltage have been known. Several methods for improving the dynamic range in such imaging sensors have been proposed. As one of the methods, there is a method of accumulating photocharges in an interpixel capacitance, which is a capacitance formed in an imaging sensor, when the charge amount of photocharges accumulated through photoelectric conversion in a light receiving element exceeds the capacitance of the light receiving element.

CITATION LIST

Patent Literature

Patent Literature 1: JP 2005-328493 A

SUMMARY

Technical Problem

The method using an interpixel capacitance described above can expand the dynamic range, but the method has a problem that photocharges overflow from the light receiving element, and the SN ratio decreases in the interpixel capacitance because of a decrease in conversion efficiency of photocharges when photocharges are read out according to reception of light with illuminance at which accumulation of photocharges is insufficient.

That is, when the place for photocharges to accumulate is shifted from the light receiving element to the interpixel capacitance, without sufficient illuminance of received light for generating sufficient photocharges with respect to the interpixel capacitance, photocharges are read out from the interpixel capacitance in a state where the charge amount of photocharges accumulated in the interpixel capacitance is small, and conversion of the read photocharges into a voltage is performed. Thus, the conversion of charges into a voltage is likely to be affected by noise, and the SN ratio decreases.

An object of the present disclosure is to provide an imaging sensor and an imaging device having a larger dynamic range.

Solution to Problem

For solving the problem described above, an imaging sensor comprising a pixel, the pixel according to one aspect of the present disclosure has a first light receiving element and a second light receiving element that generate and accumulate photocharges through photoelectric conversion in accordance with received light; and an interpixel capacitance that accumulates the photocharges overflowed from the first light receiving element and the second light receiving element during an exposure period, wherein the second light receiving element has a sensitivity to the light lower than a sensitivity to the light of the first light receiving element.

BRIEF DESCRIPTION OF DRAWINGS

FIG. 7 is a sequence diagram illustrating each drive signal for driving the unit pixel according to the first embodiment.

FIG. 8B is a schematic diagram depicting an example of potential transition of each unit regarding the operation of a low-sensitivity light receiving element according to the first embodiment.

FIG. 8C is a schematic diagram depicting an example of potential transition of each unit regarding the operation of an interpixel capacitance according to the first embodiment.

FIG. 14 is a sequence diagram illustrating each drive signal for driving the unit pixel according to the second embodiment.

FIG. 15B is a schematic diagram depicting an example of potential transition of each unit regarding a low-sensitivity light receiving element according to the second embodiment.

FIG. 15C is a schematic diagram depicting an example of potential transition of each unit regarding the operation of an interpixel capacitance according to the second embodiment.

DESCRIPTION OF EMBODIMENTS

Figure 1:
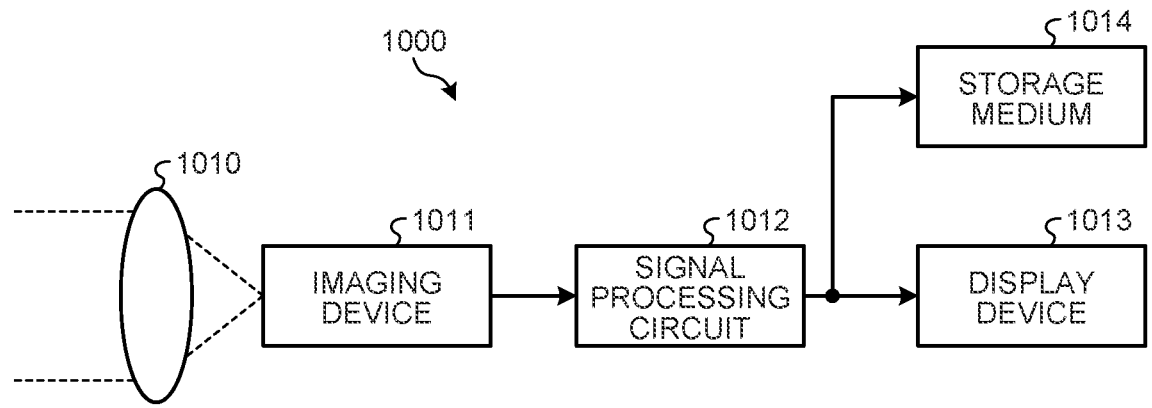
FIG. 1 is a block diagram illustrating a configuration of an example of an electronic device to which the technology according to each embodiment of the present disclosure is applicable.

Hereinafter, embodiments of the present disclosure will be described in detail with reference to the drawings. In the following embodiments, the same portions are denoted by the same reference signs, and repetitive description are omitted.

Hereinafter, embodiments of the present disclosure will be described in the following order.
1. Summary of present disclosure
2. Technology applicable to present disclosure
2-1. Electronic device
2-2. Schematic configuration of CMOS image sensor
3. Existing technology
4. First embodiment of present disclosure
4-1. Configuration example according to first embodiment
4-2. Method for driving unit pixel according to first embodiment
4-3. Modification of first embodiment
4-4. Example of planar layout and stack structure of unit pixel applicable to first embodiment
5. Second embodiment of present disclosure
5-1. Configuration example according to second embodiment
5-2. Method for driving pixel according to second embodiment
6. Effects
7. Third embodiment of present disclosure
7-1. Application example of technology of present disclosure
7-2. Application example to mobile body

1. Summary of Present Disclosure

An imaging sensor according to the present disclosure includes a plurality of pixels arranged in a matrix array. Each of the pixels includes a first light receiving element and a second light receiving element that generate and accumulate photocharges through photoelectric conversion according to received light, the second light receiving element having a sensitivity to light lower than a sensitivity to light of the first light receiving element, and an interpixel capacitance that accumulates photocharges overflowed from the first light receiving element and the second light receiving element during an exposure period.

With this configuration, for example when the first light receiving element receives light with high illuminance and overflows photocharges, the overflowed photocharges accumulate in the interpixel capacitance, and the second light receiving element also generates and accumulate photocharges through reception of the light. The second light receiving element, having a sensitivity to light lower than a sensitivity of the first light receiving element, can accumulate photocharges corresponding to reception of light with higher illuminance as compared with the first light receiving element.

Thus, for example, even when the charge amount of the photocharges generated according to the illuminance of received light exceeds the capacitance of the first light receiving element and is insufficient for the interpixel capacitance, photocharges are accumulated in the second light receiving element up to the capacitance of the second light receiving element. This allows readout of photocharges from the interpixel capacitance in a state where photocharges are sufficiently accumulated in the interpixel capacitance, the influence of noise when photocharge are converted into a voltage is alleviated, and the SN ratio can be prevented from decreasing.

2. Technology Applicable to Present Disclosure

Next, a technology applicable to each embodiment of the present disclosure will be briefly described.

(2-1. Electronic Device)

First, an electronic device to which the technology according to each embodiment of the present disclosure is applicable will be described. FIG. 1 is a block diagram illustrating a configuration of an example of an electronic device to which the technology according to each embodiment of the present disclosure is applicable.

In FIG. 1, an electronic device 1000 includes an optical unit 1010, an imaging device 1011, a signal processing circuit 1012, a display device 1013, and a storage medium 1014. In FIG. 1, an imaging sensor as an imaging device according to the present disclosure described in detail later is applied to the imaging device 1011. The imaging sensor includes a plurality of pixels that convert incident light into electric signals through photoelectric conversion, and a drive circuit that drives the plurality of pixels. Here, as the electronic device 1000, a digital still camera, a digital video camera, a drive recorder, a mobile phone with an imaging function, a smartphone, or the like may be applied.

The optical unit 1010 includes one or more lenses, a diaphragm mechanism, and a focus mechanism, and it forms an image of image light (incident light) from a subject on an imaging surface of the imaging device 1011. This causes signal charges to accumulate in the imaging device 1011 for a certain period. The signal processing circuit 1012 performs various types of signal processing including image processing on the pixel signal output from the imaging device 1011. The image signal subjected to the signal processing may be stored in the non-volatile storage medium 1014 such as a flash memory or a hard disk drive. An image based on the pixel signal may be output to the display device 1013.

(2-2. Schematic Configuration of CMOS Image Sensor)

Figure 2:
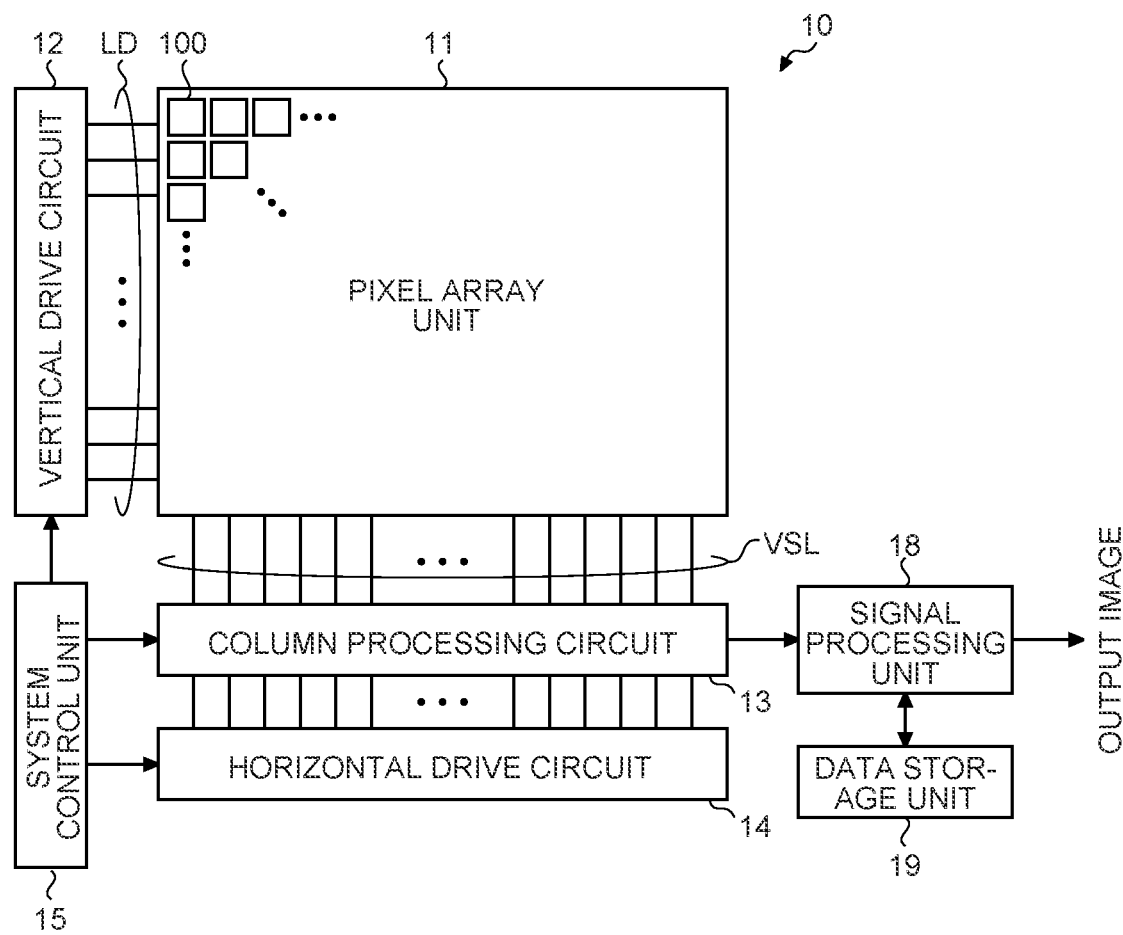
FIG. 2 is a block diagram depicting a schematic configuration example of a CMOS image sensor applicable to each embodiment.

Next, a schematic configuration of a complementary metal-oxide-semiconductor (CMOS) type solid-state imaging sensor as an imaging sensor according to the present disclosure will be described. In the following description, the CMOS type solid-state imaging sensor will be abbreviated as a CMOS image sensor. FIG. 2 is a block diagram depicting a schematic configuration example of a CMOS image sensor applicable to each embodiment. Here, the CMOS image sensor is an image sensor created by applying or partially using CMOS process. For example, the CMOS image sensor applicable to each embodiment includes a back-illuminated CMOS image sensor.

In FIG. 2, an imaging sensor 10 formed of a CMOS image sensor applicable to each embodiment has, for example, a stack structure in which a semiconductor chip on which a pixel array unit 11 is formed and a semiconductor chip on which peripheral circuits are formed are stacked. The peripheral circuit may include, for example, a vertical drive circuit 12, a column processing circuit 13, a horizontal drive circuit 14, and a system control unit 15.

The imaging sensor 10 further includes a signal processing unit 18 and a data storage unit 19. The signal processing unit 18 and the data storage unit 19 may be provided on the same semiconductor chip as the peripheral circuits, or they may be provided on another semiconductor chip.

The pixel array unit 11 has a configuration in which unit pixels 100 including a photoelectric conversion element as a light receiving element that generates and accumulates photocharges according to the amount of received light are arranged in a matrix (two-dimensional lattice) array. Here, row direction refers to an array direction of pixels in a pixel row (that is, in a horizontal direction), and column direction refers to an array direction of pixels in a pixel column (that is, in a vertical direction). Each unit pixel 100 includes a plurality of light receiving elements. A specific circuit configuration and pixel structure of the unit pixel 100 will be described later in detail.

In the pixel array unit 11, a pixel drive line LD is wired along the row direction for each pixel row, and a vertical signal line VSL is wired along the column direction for each pixel column with respect to the pixel array in a matrix. The pixel drive line LD transmits a drive signal for driving the pixels when a signal is read out from the pixels. In FIG. 1, the pixel drive line LD is illustrated as one wiring. However, the pixel drive line LD includes a plurality of signal lines in practice. One end of the pixel drive line LD is connected to an output end corresponding to each row of the vertical drive circuit 12.

The vertical drive circuit 12 includes a shift register and an address decoder, and it drives all the pixels of the pixel array unit 11 at the same time or in units of rows. That is, the vertical drive circuit 12 constitutes a drive unit that controls the operation of each pixel of the pixel array unit 11 together with the system control unit 15 that controls the vertical drive circuit 12. Although a specific configuration of the vertical drive circuit 12 is not illustrated, the vertical drive circuit 12 typically includes two scanning systems of a readout scanning system and a sweep scanning system.

The readout scanning system sequentially selects and scans the unit pixels 100 of the pixel array unit 11 row by row to read out signals from the unit pixels 100. A row selected for signal readout by the readout scanning system is referred to as an RD row (read row). The signal read out from the unit pixel 100 is an analog signal. The sweep scanning system performs sweep scanning on a readout row on which readout scanning is performed by the readout scanning system prior to the readout scanning by the time of exposure.

By the sweep scanning by the sweep scanning system, unnecessary photocharges are swept out from the light receiving element of the unit pixel 100 in the readout row, whereby the light receiving element is reset. Then, by sweeping out (resetting) unnecessary photocharges in the sweep scanning system, a so-called electronic shutter operation is performed. Here, the electronic shutter operation refers to an operation of discarding photocharges of the light receiving element and newly starting exposure (starting accumulation of photocharges). A row selected for sweep scanning by the sweep scanning system is referred to as an SH row (shutter row).

The signal read out through the readout operation by the readout scanning system corresponds to the amount of light received after the immediately preceding readout operation or electronic shutter operation. Then, a period from the readout timing by the immediately preceding readout operation or the sweep timing by the electronic shutter operation to the readout timing by the current readout operation is a photocharge accumulation period (also referred to as an exposure period) in the unit pixel 100.

The signal output from each unit pixel 100 of the pixel row selectively scanned by the vertical drive circuit 12 is input to the column processing circuit 13 via the corresponding vertical signal line VSL for each pixel column. The column processing circuit 13 performs predetermined signal processing on a signal output from each unit pixel 100 of the selected row via the vertical signal line VSL for each pixel column of the pixel array unit 11, and it temporarily holds a pixel signal after the signal processing.

Specifically, the column processing circuit 13 performs at least noise removal processing, for example, correlated double sampling (CDS) processing or double data sampling (DDS) processing, as the signal processing. For example, through the CDS processing, reset noise and fixed pattern noise unique to the pixel such as threshold variation of the amplification transistor in the unit pixel 100 are removed. The column processing circuit 13 also has, for example, an analog-digital (AD) conversion function, and it converts an analog pixel signal read out from the photoelectric conversion element into a digital signal and outputs the digital signal.

The horizontal drive circuit 14 includes a shift register and an address decoder, and it sequentially selects readout circuits (hereinafter, referred to as a pixel circuit) of the unit pixels 100 corresponding to pixel columns of the column processing circuit 13. Through the selective scanning by the horizontal drive circuit 14, pixel signals subjected to signal processing for each pixel circuit in the column processing circuit 13 are sequentially output.

The system control unit 15 includes a timing generator that generates various timing signals, and it performs drive control of the vertical drive circuit 12, the column processing circuit 13, the horizontal drive circuit 14, and the like based on various timings generated by the timing generator.

The signal processing unit 18 has at least an arithmetic processing function and performs various types of signal processing such as arithmetic processing on the pixel signal output from the column processing circuit 13. The data storage unit 19 temporarily stores data necessary for signal processing in the signal processing unit 18.

The image data output from the signal processing unit 18 may be subjected to predetermined processing in an application processor or the like in the electronic device equipped with the imaging sensor 10, or may be transmitted to the outside via a predetermined network, for example.

3. Existing Technology

Next, prior to the description of each embodiment according to the present disclosure, an existing technology related to the present disclosure will be described for easy understanding.

Figure 3A:
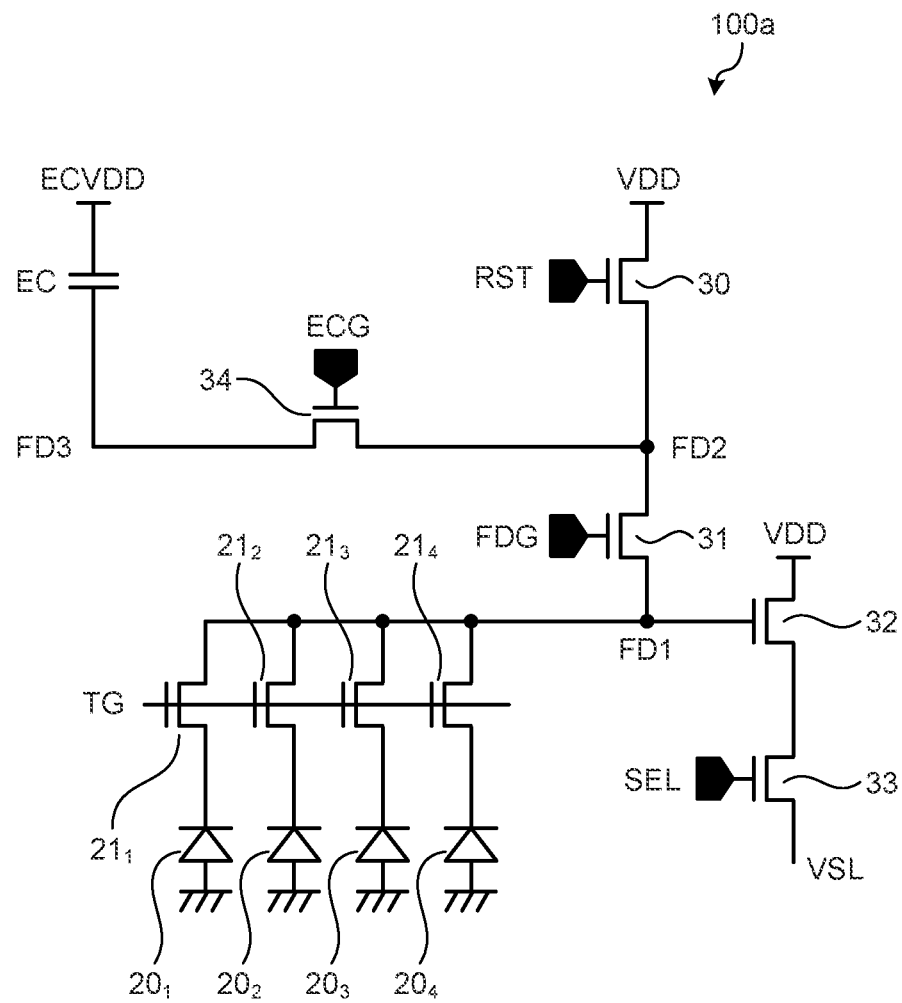
FIG. 3A is a schematic diagram depicting an example of a circuit configuration of a unit pixel according to an existing technology.

FIG. 3A is a schematic diagram depicting an example of a circuit configuration of the unit pixel 100 according to an existing technology. In FIG. 3A, a unit pixel 100a includes four light receiving elements $20_1$, $20_2$, $20_3$, and $20_4$ each of which is a photodiode.

Figure 3B:
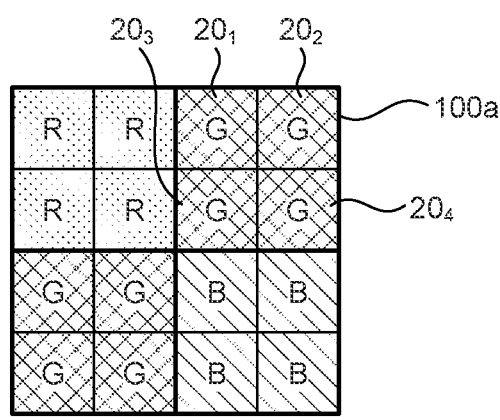
FIG. 3B is a diagram depicting an example of an array of four light receiving elements included in a unit pixel.

FIG. 3B is a diagram depicting an example of an array of the four light receiving elements $20_1$ to $20_4$ included in the unit pixel 100a. In the example of FIG. 3B, four light receiving elements $20_1$ to $20_4$ are arranged in an array of 2 rows×2 columns in the unit pixel 100a, and color filters are provided for each unit pixel 100a. The unit pixels 100a each provided with a color filter of each of red (R), green (G), and blue (B) are arranged according to a Bayer array. The array of the unit pixels 100a is not limited to the Bayer array.

The description returns to FIG. 3A. The unit pixel 100a further includes transfer transistors $21_1$, $21_2$, $21_3$, and $21_4$ respectively corresponding to the light receiving elements $20_1$, $20_2$, $20_3$, and $20_4$, a reset transistor 30, a conversion efficiency switching transistor 31, an amplification transistor 32, a selection transistor 33, and an accumulation transistor 34. Each transistor is formed of an n-type metal oxide semiconductor (MOS) transistor. Of these transistors, a depletion type MOS transistor is applied to at least the transfer transistors $21_1$ to $21_4$, the conversion efficiency switching transistor 31, and the accumulation transistor 34.

Each of the light receiving elements $20_1$ to $20_4$ has an anode connected to a ground potential. Their cathodes are connected to a floating diffusion layer FD1 via the transfer transistors $21_1$ to $21_4$, respectively. A drive signal TG is commonly input to the gates of the transfer transistors $21_1$ to $21_4$.

That is, by setting the drive signal TG to a high state, each of the transfer transistors $21_1$ to $21_4$ is brought into a conductive state, and the photocharges accumulated in the light receiving elements $20_1$ to $20_4$ are merged and transferred to the floating diffusion layer FD1. This allows transfer of more photocharges to the floating diffusion layer FD1 with respect to the reception of low illuminance light as compared with a case where the light receiving element is used alone, which can increase the sensitivity to received light.

The floating diffusion layer FD1 is further connected to the source of the conversion efficiency switching transistor 31 and the gate of the amplification transistor 32. In the conversion efficiency switching transistor 31, the drain is connected to a floating diffusion layer FD2, and a drive signal FDG is input to the gate. When the conversion efficiency switching transistor 31 is brought into a conductive state by the drive signal FDG, the floating diffusion layer FD1 and the floating diffusion layer FD2 are coupled, and when the conversion efficiency switching transistor 31 is brought into a non-conductive state, the floating diffusion layer FD1 and the floating diffusion layer FD2 are divided.

The floating diffusion layer FD2 is further connected to the source of the reset transistor 30 and the source of the accumulation transistor 34. In the reset transistor 30, the drain is connected to a voltage VDD, and a drive signal RST is input to the gate. In the accumulation transistor 34, the drain is connected to a floating diffusion layer FD3, and a drive signal ECG is input to the gate. When the accumulation transistor 34 is brought into a conductive state by the drive signal ECG, the floating diffusion layer FD3 and the floating diffusion layer FD2 are coupled, and when the accumulation transistor 34 is brought into a non-conductive state, the floating diffusion layer FD3 and the floating diffusion layer FD4 are divided. The floating diffusion layer FD3 is further connected to one end of an interpixel capacitance EC. The other end of the interpixel capacitance EC is connected to a voltage ECVDD.

As described above, in the amplification transistor 32, FD1 is connected the gate, the voltage VDD is connected to the drain, and the drain of the selection transistor 33 is connected to the source. In the selection transistor 33, the source is connected to the vertical signal line VSL, and the drive signal SEL is input to the gate. The photocharges accumulated in the floating diffusion layer FD1 is converted into a voltage when being read out from the floating diffusion layer FD1. The pixel signal obtained by converting the photocharges into a voltage is amplified by the amplification transistor 32 and output to the vertical signal line VSL via the selection transistor 33 in a period when the selection transistor 33 is brought into a conductive state by the drive signal SEL.

Here, the operation in the configuration of FIG. 3A will be briefly described. After a certain exposure time, the drive signal FDG is set to a high state to bring the conversion efficiency switching transistor 31 into a conductive state and to couple the floating diffusion layer FD1 and the floating diffusion layer FD2, and a noise level N2 in a low conversion efficiency region is read out from the coupled floating diffusion layers FD1 and FD2. Next, the drive signal FDG is set to a low state to bring the conversion efficiency switching transistor 31 into a non-conductive state and to divide the coupled floating diffusion layer FD1 and floating diffusion layer FD2, and a noise level N1 in a high conversion efficiency region is read out from the floating diffusion layer FD1.

When a charge Q accumulated in a capacitance C is read out from the capacitance and converted into a voltage V, the smaller the charge Q, the smaller the obtained voltage V when the capacitance C is constant, according to V=Q/C derived from the relationship of Q=CV. As the voltage V is smaller, it is more susceptible to noise, and the conversion efficiency of the charge Q into the voltage V is reduced. Thus, a region where the charge Q accumulated in the capacitance C is equal to or less than a predetermined value, that is, a region where the illuminance of the light received by the light receiving element is less than a predetermined value, is determined as a low conversion efficiency region, and a region where the charge Q is equal to or more than the predetermined value is determined as a high conversion region, to divide the processing.

Next, the drive signal TG is set to a high state to bring the transfer transistors $21_1$ to $21_4$ into a conductive state, and the photocharges accumulated in the light receiving elements $20_1$ to $20_4$ are merged and transferred to the floating diffusion layer FD1. Then, the drive signal TG is set to a low state to bring the transfer transistors $21_1$ to $21_4$ into a non-conductive state, and a signal level S1 in the high conversion efficiency region is read out from the FD1.

Subsequently, the drive signal FDG is set to a high state to bring the conversion efficiency switching transistor 31 into a conduction state and to couple the floating diffusion layer FD1 and the floating diffusion layer FD2, the drive signal TG is set to a high state again to bring the transfer transistors $21_1$ to $21_4$ into a conduction state, all the photocharges accumulated in the light receiving elements $20_1$ to $20_4$ are transferred to the coupled floating diffusion layers FD1 and FD2, and a signal level S2 in the low conversion efficiency region is read out from the floating diffusion layers FD1 and FD2.

In the case of high illuminance, the photocharges overflowed from the light receiving elements $20_1$ to $20_4$ accumulate in the interpixel capacitance EC. As described above, a depletion type transistor is applied to the transfer transistors $21_1$ to $21_4$, the conversion efficiency switching transistor 31, and the accumulation transistor 34. Thus, the photocharges overflowed from the light receiving elements $20_1$ to $20_4$ with the reception of high-illuminance light accumulate in the interpixel capacitance EC via the transfer transistors $21_1$ to $21_4$, the conversion efficiency switching transistor 31, and the accumulation transistor 34.

Here, the drive signal FDG are set to a high state to bring the conversion efficiency switching transistor 31 into a conductive state and to couple the floating diffusion layer FD1 and the floating diffusion layer FD2. The drive signal ECG are set to a high state to bring the accumulation transistor 34 into a conductive state and to further couple the floating diffusion layer FD3 to the coupled floating diffusion layers FD1 and FD2. The photocharges accumulated in the interpixel capacitance EC are transferred to the coupled floating diffusion layers FD1, FD2, and FD3. A signal level S4 is read out from the coupled floating diffusion layers FD1, FD2, and FD3.

Thereafter, the drive signal RST is set to a high state to bring the reset transistor 30 into a conductive state, and the photocharges accumulated in the floating diffusion layers FD1, FD2, and FD3 are reset. Then, the drive signal RST is set to a low state to bring the reset transistor 30 into a non-conductive state, and then a noise level N4 is read out from the coupled floating diffusion layers FD1, FD2, and FD3.

The noise level N1 is subtracted from the signal level S1 through CDS to generate a pixel signal from the high conversion efficiency region. Similarly, the noise level N2 is subtracted from the signal level S2 through CDS to generate a pixel signal from the low conversion efficiency region. For the signal level S4 and the noise level N4, since the signal level S4 is read first, the noise level N4 is subtracted from the signal level S4 through the DDS to generate a pixel signal.

Since the noise level N2 and the signal level S2 are not continuously read out when the noise level N2 is subtracted from the signal level S2 through CDS, a line memory for temporarily holding the noise level N2 is required. The voltage ECVDD connected to the other end of the interpixel capacitance EC may be a power supply voltage or a ground voltage, and may have any fixed potential.

Figure 4:
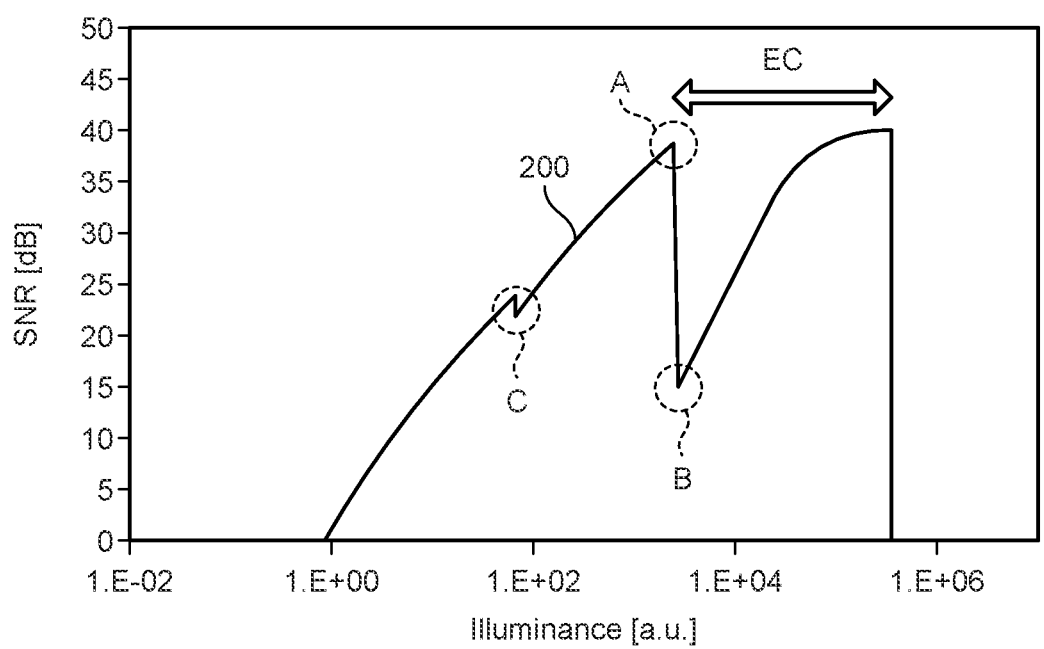
FIG. 4 is a graph depicting an example of an SN ratio characteristic with respect to illuminance in the configuration according to an existing technology.

FIG. 4 is a graph depicting an example of a signal-noise ratio (SNR) characteristic with respect to illuminance in the configuration according to the existing technology. In FIG. 4, the horizontal axis represents illuminance in logarithmic display, and the vertical axis represents SNR [dB].

In FIG. 4, a range from the low illuminance side to the peak A of the SNR curve 200 indicates the SNR characteristic of the light receiving elements $20_1$ to $20_4$, and a range from the peak A to the high illuminance side indicates the SNR characteristic of the interpixel capacitance EC. The peak A and the dip corresponding to the peak A indicate a joint between the SNR characteristic of the light receiving elements $20_1$ to $20_4$ and the SNR characteristic of the interpixel capacitance EC.

More specifically, the illuminance of the peak A corresponds to the upper limit of the amount of photocharges that can be accumulated in the light receiving elements $20_1$ to $20_4$, and when light exceeding the illuminance of the peak A is received, photocharges overflow from the light receiving elements $20_1$ to $20_4$. On the lower illuminance side than the peak A, a pixel signal is generated based on the photocharges accumulated in the light receiving elements $20_1$ to $20_4$. On the high illuminance side from the peak A, the photocharges overflowed from the light receiving elements $20_1$ to $20_4$ are merged and accumulated in the interpixel capacitance EC, and a pixel signal is generated based on the photocharges accumulated in the interpixel capacitance EC.

Here, the SNR greatly decreases at the joint of the SNR characteristic of the light receiving elements $20_1$ to $20_4$ and the SNR characteristic of the interpixel capacitance EC. Since the interpixel capacitance EC is very large (in this example, EC=about 150 [fF]) with respect to the capacitance obtained by merging the light receiving elements $20_1$ to $20_4$, a sufficient accumulation amount as the interpixel capacitance EC is not obtained with the illuminance of the joint, and the conversion efficiency of the accumulated photocharges into a voltage is low. Thus, from the relationship of V=Q/C described above, the level of the pixel signal converted from the photocharges accumulated in the interpixel capacitance EC is low, the pixel signal is easily affected by noise, and the SNR decreases. In this case, for example, a medium illuminance region (intermediate gradation region) of the image includes a lot of noises.

In FIG. 4, the peak/dip C indicates a connection portion between the low conversion efficiency region and the high conversion efficiency region in each of the light receiving elements $20_1$ to $20_4$.

4. First Embodiment of Present Disclosure

Figure 5A:
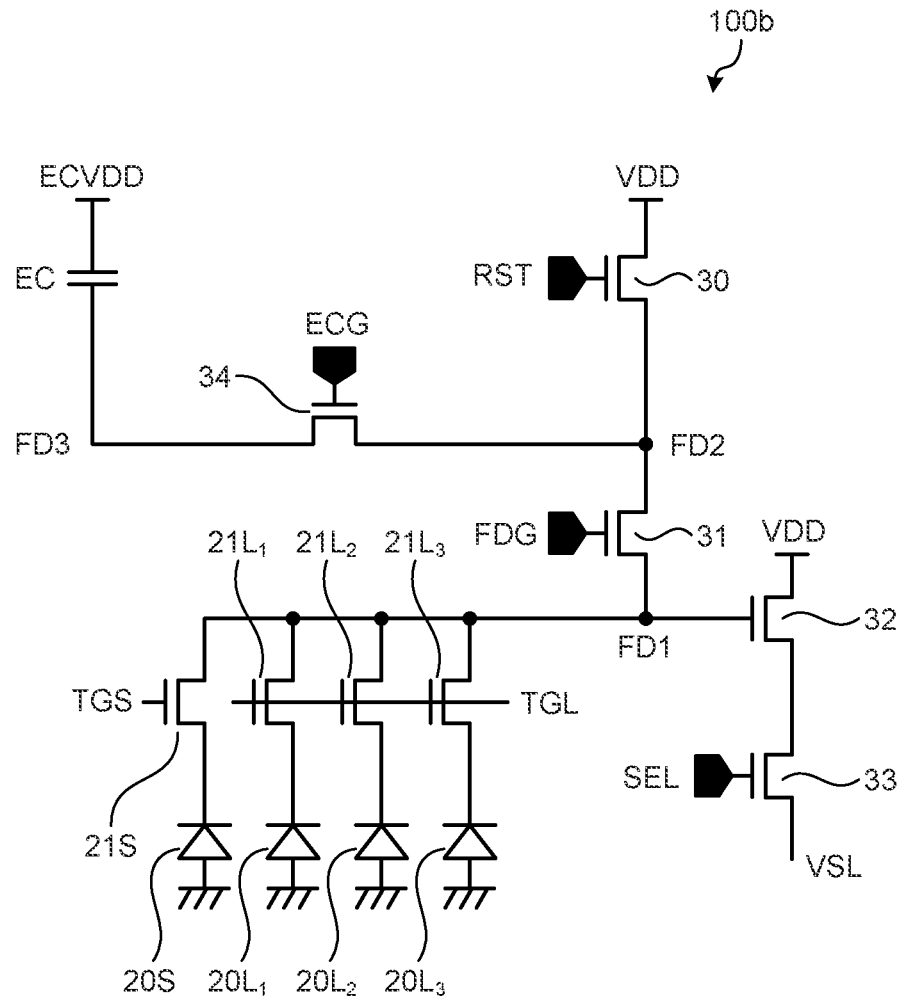
FIG. 5A is a schematic diagram depicting an example of a circuit configuration of a unit pixel according to a first embodiment.

Next, a first embodiment of the present disclosure will be described.
(4-1. Configuration Example According to First Embodiment) FIG. 5A is a schematic diagram depicting an example of a circuit configuration of a unit pixel according to the first embodiment. In FIG. 5A, the drive signals TGL, TGS, FDG, ECG, RST, and SEL are generated by the vertical drive circuit 12 under the control of the system control unit 15, and they are supplied to the pixel array unit 11 for each row.

In a unit pixel 100b in FIG. 5A, with respect to the unit pixel 100a according to the existing technology described with reference to FIG. 3A, photocharges accumulated in light receiving elements $20L_1$ to $20L_3$ (first light receiving elements) among a plurality of light receiving elements 20S, $20L_1$, $20L_2$, and $20L_3$ are merged via transfer transistors $21L_1$, $21L_2$, and $21L_3$ (first transistors) whose conduction/non-conduction states are controlled by the common drive signal TGL and transferred to the floating diffusion layer FD1. On the other hand, photocharges accumulated in the light receiving element 20S (second light receiving element) are transferred to the floating diffusion layer FD1 via a transfer transistor 21S (second transistor) whose conduction/non-conduction state is controlled by the drive signal TGS different from the drive signal TGL. That is, the light receiving elements $20L_1$ to $20L_3$ and the light receiving element 20S are independently controlled.

Each of the light receiving elements $20L_1$, $20L_2$, and $20L_3$ corresponds to a third light receiving element. Each of the light receiving elements $20L_1$, $20L_2$, and $20L_3$ has a light receiving surface substantially equal in size to the light receiving surface of the light receiving element 20S. In the example of FIG. 5A, one light receiving element 20S is provided for three light receiving elements $20L_1$, $20L_2$, and $20L_3$, but the number of the light receiving element 20S is not limited to this example. The number of the light receiving element 20S may be any as long as the number is smaller than the number of the light receiving elements $20L_1$, $20L_2$, and $20L_3$.

Figure 5B:
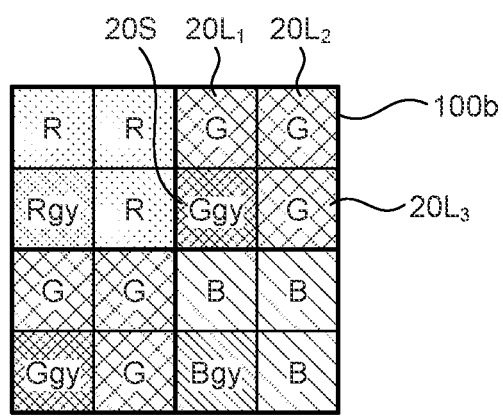
FIG. 5B is a diagram depicting an example of an array of light receiving elements included in the unit pixel according to the first embodiment.

FIG. 5B is a diagram illustrating an example of an array of the light receiving element 20S and the light receiving elements $20L_1$ to $20L_3$ included in the unit pixel $100b$ according to the first embodiment. In the unit pixel $100b$ in the example of FIG. 5B, the light receiving element 20S and the light receiving elements $20L_1$ to $20L_3$ are arranged in an array of 2 rows×2 columns, and color filters of R color, G color, and B color are provided for the unit pixel $100b$ according to a Bayer array.

Here, the light receiving element 20S having a low sensitivity may be provided with a neutral density filter (ND filter) in addition to the color filters of R color, G color, and B color. The ND filter is an optical filter that is achromatic (has no color information) and has a transmittance of more than 0% and less than 100%. As an example, it is conceivable to apply an ND filter having a transmittance of about 10% to several 10%. In the example of FIG. 5B, the filter Ggy indicates a state in which the ND filter is provided for the color filter of G color. Similarly, the filters Rgy and Bgy indicate a state in which the ND filters are provided for the color filters of R color and B color, respectively.

The description returns to FIG. 5A. According to this configuration, the light receiving element 20S has a lower sensitivity to light as compared with the light receiving elements $20L_1$ to $20L_3$ in which photocharges are merged, according to the area ratio between the light receiving surface of the three light receiving elements $20L_1$ to $20L_3$ in which transferred photocharges are merged and the light receiving surface of one light receiving element 20S. That is, the light receiving element 20S can deal with reception of light with higher illuminance with respect to the set of the light receiving elements $20L_1$ to $20L_3$.

Thus, the decrease in SNR at the illuminance at which the readout source of the photocharges is switched from the light receiving elements $20_1$ to $20_4$ to the interpixel capacitance EC, which is indicated by the reference sign "A" in the graph of FIG. 4, can be covered by the pixel signal corresponding to the readout of the photocharges from the light receiving element 20S.

(Another Example of Configuration According to First Embodiment)

Figure 5C:
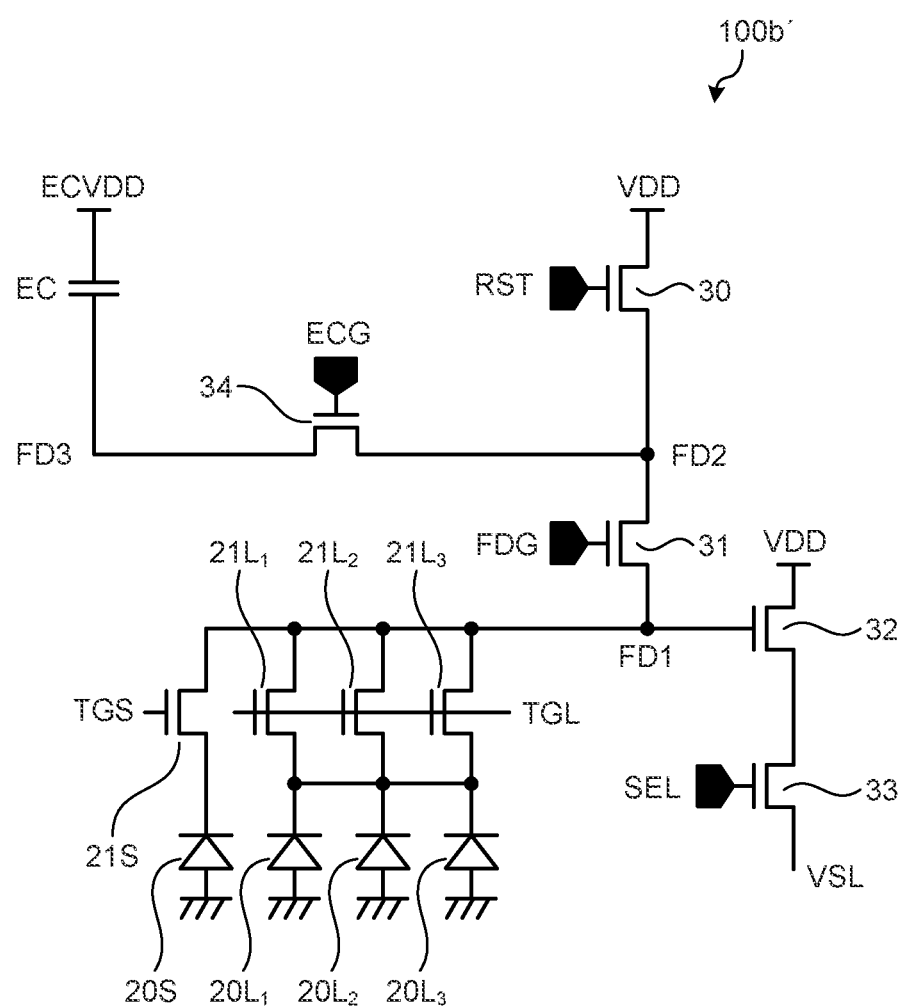
FIG. 5C is a schematic diagram depicting another example of the circuit configuration of the unit pixel according to the first embodiment.

FIG. 5C is a schematic diagram depicting another example of the circuit configuration of the unit pixel according to the first embodiment. The example of FIG. 5C is an example in which a connection point connecting the light receiving element $20L_1$ and the transfer transistor $21L_1$, a connection point connecting the light receiving element $20L_2$ and the transfer transistor $21L_2$, and a connection point connecting the light receiving element $20L_3$ and the transfer transistor $21L_3$ are connected to each other.

According to this configuration, the photocharges accumulated in the light receiving elements $20L_1$ to $20L_3$ are merged, and the merged photocharges are distributed to the transfer transistors $21L_1$ to $21L_3$ and transferred to the floating diffusion layer FD1.

With such a configuration as well, in the same manner as in the configuration of FIG. 5A described above, the decrease in SNR at the illuminance at which the readout source of the photocharges is switched from the light receiving elements $20_1$ to $20_4$ to the interpixel capacitance EC, which is indicated by the reference sign "A" in the graph of FIG. 4, can be covered by the pixel signal corresponding to the readout of the photocharges from the light receiving element 20S.

(4-2. Method for Driving Unit Pixel According to First Embodiment)

Next, a method for driving the unit pixel $100b$ according to the first embodiment will be described. First, the operation in the configuration of FIG. 5A will be briefly described. After a certain exposure time, the drive signal FDG is set to a high state to bring the conversion efficiency switching transistor 31 (fourth transistor) into a conductive state and to couple the floating diffusion layer FD1 and the floating diffusion layer FD2, and a noise level N2 in a low conversion efficiency region is read out from the coupled floating diffusion layers FD1 and FD2. Next, the drive signal FDG is set to a low state to bring the conversion efficiency switching transistor 31 into a non-conductive state and to divide the coupled floating diffusion layer FD1 and floating diffusion layer FD2, and a noise level N1 in a high conversion efficiency region is read out from the floating diffusion layer FD1.

Next, the drive signal TGL is set to a high state to bring the transfer transistors $21L_1$ to $21L_3$ into a conductive state, and the photocharges accumulated in the light receiving elements $20L_1$ to $20L_3$ are merge and transferred to the floating diffusion layer FD1. Then, the drive signal TGL is set to a low state to bring the transfer transistors $21L_1$ to $21L_3$ into a non-conductive state, and a signal level S1 in the high conversion efficiency region is read out from the FD1.

Subsequently, the drive signal FDG is set to a high state to bring the conversion efficiency switching transistor 31 into a conduction state and to couple the floating diffusion layer FD1 and the floating diffusion layer FD2, the drive signal TG is set to a high state again to bring the transfer transistors $21_1$ to $21_4$ into a conduction state, all the photocharges accumulated in the light receiving elements $20_1$ to $20_4$ are transferred to the coupled floating diffusion layers FD1 and FD2, and a signal level S2 in the low conversion efficiency region is read out from the floating diffusion layers FD1 and FD2.

Next, after a noise level N3 in the light receiving element 20S is read out, the drive signal TGS is set to a high state to bring the transfer transistor 21S into a conductive state, the photocharges accumulated in the light receiving element 20S are transferred to the floating diffusion layer FD1, and the signal level S3 is read out from the floating diffusion layer FD1.

In the case of high illuminance, the photocharges overflowed from the light receiving elements $20_1$ to $20_4$ accumulate in the interpixel capacitance EC. As described above, a depletion type transistor is applied to the transfer transistors $21_1$ to $21_4$, the conversion efficiency switching transistor 31, and the accumulation transistor 34. Thus, the photocharges overflowed from the light receiving elements $20_1$ to $20_4$ with the reception of high-illuminance light accumulate in the interpixel capacitance EC via the transfer transistors $21_1$ to $21_4$, the conversion efficiency switching transistor 31, and the accumulation transistor 34.

Here, the drive signal FDG are set to a high state to bring the conversion efficiency switching transistor 31 into a conductive state and to couple the floating diffusion layer FD1 and the floating diffusion layer FD2. The drive signal ECG is set to a high state to bring the accumulation transistor 34 (third transistor) into a conductive state and to further couple the floating diffusion layer FD3 to the coupled floating diffusion layers FD1 and FD2. The photocharges accumulated in the interpixel capacitance EC are transferred to the coupled floating diffusion layers FD1, FD2, and FD3. A signal level S4 is read out from the coupled floating diffusion layers FD1, FD2, and FD3.

Thereafter, the drive signal RST is set to a high state to bring the reset transistor 30 into a conductive state, and the photocharges accumulated in the floating diffusion layers FD1, FD2, and FD3 are reset. Then, the drive signal RST is set to a low state to bring the reset transistor 30 into a non-conductive state, and then a noise level N4 is read out from the coupled floating diffusion layers FD1, FD2, and FD3.

The noise level N1 is subtracted from the signal level S1 through CDS to generate a pixel signal from the high conversion efficiency region in each of the light receiving elements $20L_1$ to $20L_3$. Similarly, the noise level N2 is subtracted from the signal level S2 through CDS to generate a pixel signal from the low conversion efficiency region in each of the light receiving elements $20L_1$ to $20L_3$. Further, the noise level N3 is subtracted from the signal level S3 through CDS to generate a pixel signal from the light receiving element 20S. For the signal level S4 and the noise level N4, since the signal level S4 is read first, the noise level N4 is subtracted from the signal level S4 through the DDS to generate a pixel signal.

Since the noise level N2 and the signal level S2 are not continuously read out when the noise level N2 is subtracted from the signal level S2 through CDS, a line memory for temporarily holding the noise level N2 is required. The voltage ECVDD connected to the other end of the interpixel capacitance EC may be a power supply voltage or a ground voltage, and may have any fixed potential.

Figure 6:
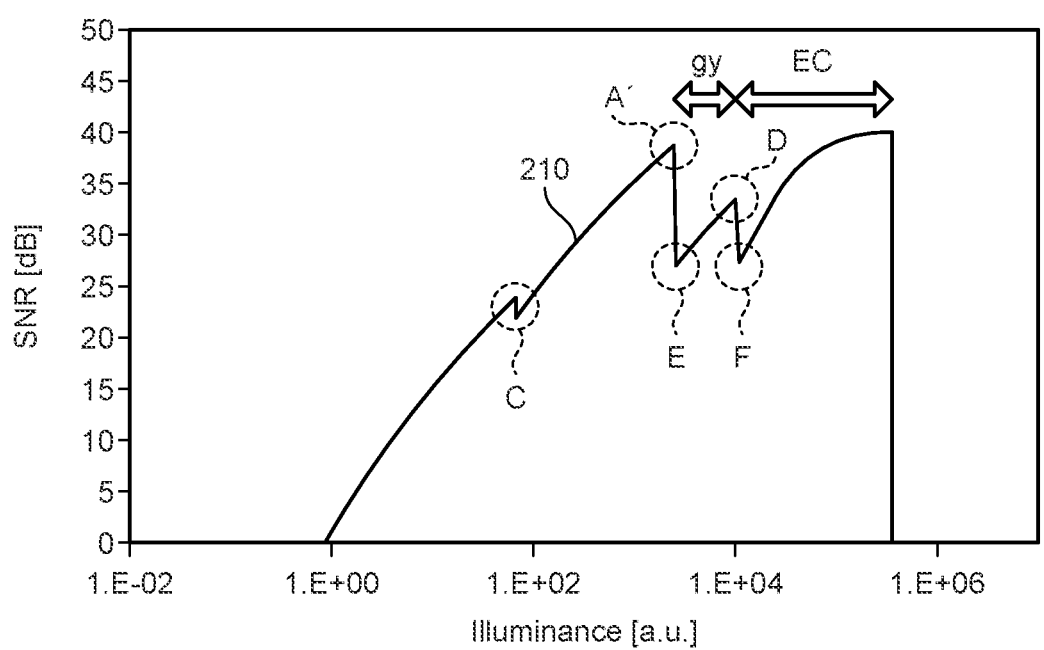
FIG. 6 is a graph depicting an example of an SN ratio characteristic with respect to illuminance in the configuration according to the first embodiment.

FIG. 6 is a graph depicting an example of an SN ratio characteristic with respect to illuminance in the configuration according to the first embodiment. In FIG. 6, portions corresponding to those in FIG. 4 described above are denoted by the same reference numerals, and a detailed description thereof will be omitted.

In FIG. 6, the range from the low illuminance side to the peak A' of the SNR curve 210 indicates the SNR characteristic of the light receiving elements $20L_1$ to $20L_3$, the range from the peak A' to the peak D indicates a part (high conversion efficiency region) of the SNR characteristic of the light receiving element 20S, and the higher illuminance side than the peak D indicates the SNR characteristic of the interpixel capacitance EC.

More specifically, the illuminance at the peak A' corresponds to the upper limit of the amount of photocharges that can be accumulated in the light receiving elements $20L_1$ to $20L_3$, and when light exceeding the illuminance at the peak A' is received, photocharges overflow from the light receiving elements $20L_1$ to $20L_3$. On the lower illuminance side than the peak A', a pixel signal is generated based on the photocharges accumulated in the light receiving elements $20L_1$ to $20L_3$. On the higher illuminance side than the peak A', the photocharges overflowed from the light receiving elements $20L_1$ to $20L_3$ are merged and accumulated in the interpixel capacitance EC.

On the other hand, since the light receiving element 20S has a lower sensitivity to light than that of the light receiving elements $20L_1$ to $20L_3$, the peak D having illuminance higher than that of the peak A' corresponds to the upper limit of the amount of photocharges that can accumulate. A pixel signal is generated based on the photocharges accumulated in the light receiving element 20S at the illuminance between the peak A' and the peak D indicated by the range gy in FIG. 6. On the higher illuminance side than the peak D, the photocharges overflowed from the light receiving element 20S further accumulate in the interpixel capacitance EC. On the higher illuminance side than the peak D in FIG. 6, a pixel signal based on the photocharges accumulated in the interpixel capacitance EC is generated.

In this manner, in the first embodiment, the interpixel capacitance EC is provided in the unit pixel 100b, and the light receiving elements $20L_1$ to $20L_3$ having a high sensitivity to light and the light receiving element 20S having a low sensitivity to light are provided. This prevents the SNR from decreasing at a junction between the SNR characteristic of the light receiving elements $20L_1$ to $20L_3$ and the SNR characteristic of the light receiving element 20S as indicated by the dip E in FIG. 6. Further, as indicated by the dip F in FIG. 6, the SNR is also prevented from decreasing at a junction between the SNR characteristic of the light receiving element 20S and the SNR characteristic of the interpixel capacitance EC. Thus, it is possible to prevent image quality degradation in the intermediate gradation of an image.

Next, the method for driving the unit pixel 100b according to the first embodiment will be described in more detail.

FIG. 7 is a sequence diagram illustrating each drive signal for driving the unit pixel 100b according to the first embodiment. In FIG. 7, the uppermost row illustrates a horizontal synchronization signal XHS, lower rows illustrate the drive signals in the shutter row (SH row), and further lower rows illustrate the drive signals in the read row (RD row). The period from the time point $t_0$ to the time point $t_8$ is one horizontal period. In FIG. 7, the drive signals are drive signals SEL, FDG, RST, ECG, TGL, and TGS from the top in both the SH row and the RD row. These drive signals are generated by the vertical drive circuit 12 under the control of the system control unit 15 and supplied to each unit of the unit pixel 100b.

In FIG. 7, for the sake of explanation, the operation of the SH row in the upper row and the operation of the RD row in the lower row are illustrated to be performed in synchronization and in parallel, but in practice, the operation of the SH row and the operation of the RD row are not necessarily performed in synchronization and in parallel.

Figure 8A:
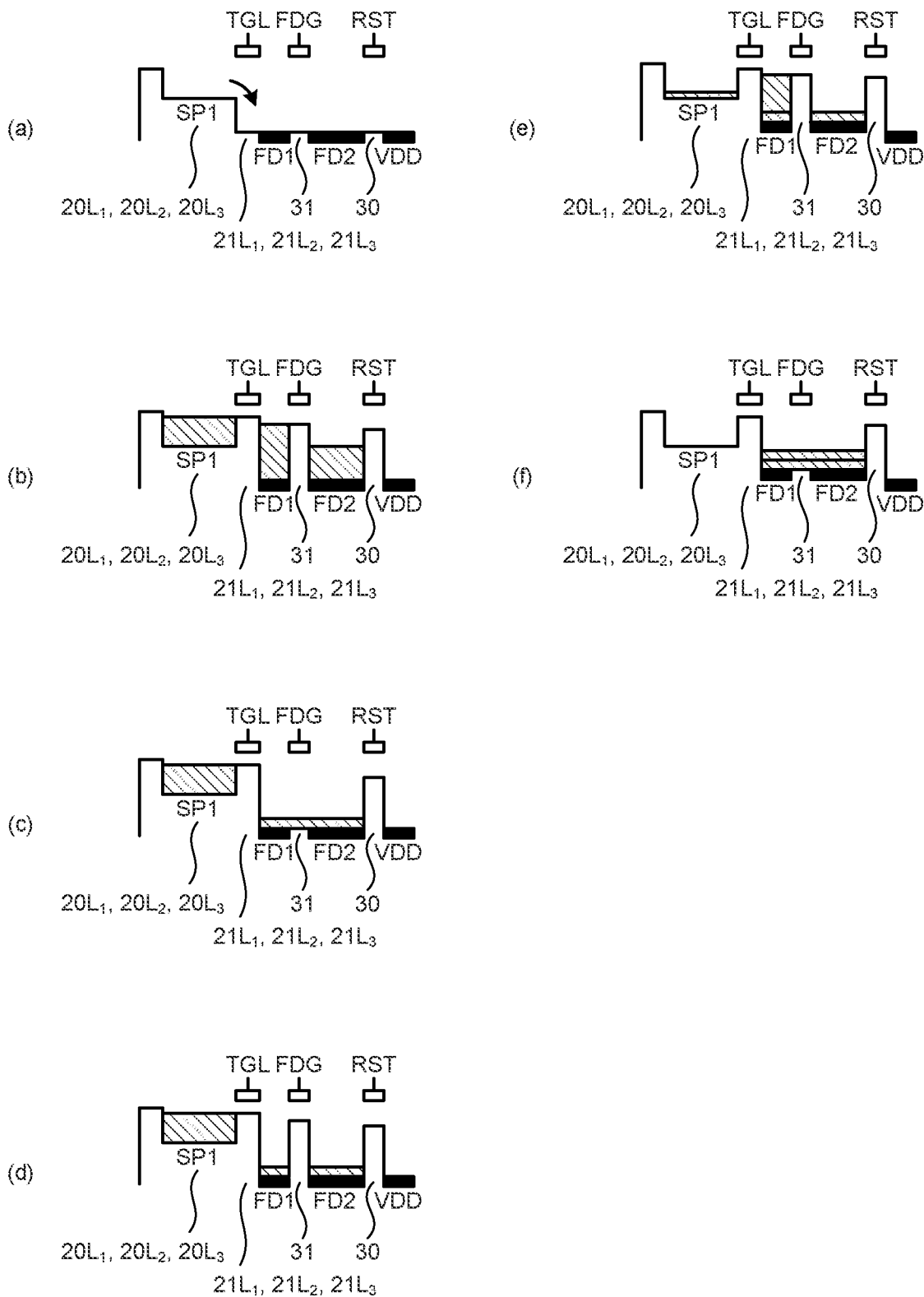
FIG. 8A is a schematic diagram depicting an example of potential transition of each unit regarding the operation of a high-sensitivity light receiving element according to the first embodiment.

FIGS. 8A, 8B, and 8C are schematic diagrams illustrating examples of potential transition of each unit regarding the operation of the light receiving elements $20L_1$ to $20L_3$ of high sensitivity, the light receiving element 20S of low sensitivity, and the interpixel capacitance EC according to the first embodiment, respectively.

In FIGS. 8A, 8B, and 8C, black filled portions of the floating diffusion layers FD1 and FD2 indicate charges present in the initial state. In FIG. 8A, the potential where the light receiving elements $20L_1$ to $20L_3$ are coupled is illustrated as SP1. In FIG. 8B, the potential of the light receiving element 20S is indicated as SP2. Hatched portions in SP1 and SP2 in FIGS. 8A, 8B, and 8C, the floating diffusion layers FD1 and FD2, and the interpixel capacitance EC in FIG. 8C indicate photocharges generated by the light receiving elements 20S and the light receiving elements $20L_1$ to $20L_3$.

(Operation in SH Row)

First, the operation in the SH row will be described. In the SH row, the drive signal SEL is always in a low state, and the selection transistor 33 is brought into a non-conductive state. The drive signal FDG is set to a high state at the time point $t_3$, and the conversion efficiency switching transistor 31 is brought into a conductive state. The drive signal RST is set to a high state at the time point $t_6$, and the reset transistor 30 is brought into a conductive state. That is, at the time point $t_6$, the floating diffusion layers FD1 and FD2 are coupled, connected to the power supply voltage VDD, and reset.

In the SH row, the drive signals TGL and TGS are set to a high state at the time point $t_{sh}$ immediately after the time point $t_6$. This causes the transfer transistors 21S and $21L_1$ to $21L_3$ to be conductive and the light receiving elements 20S and $20L_1$ to $20L_3$ to be reset.

Examples of the potential of each unit at the time point $t_{sh}$ are illustrated in the section (a) of FIG. 8A, the section (a) of FIG. 8B, and the section (a) of FIG. 8C. As illustrated in the section (a) of FIG. 8A, the transfer transistors $21L_1$ to $21L_3$, the conversion efficiency switching transistor 31, and the reset transistor 30 are brought into a conductive state, and the charges of SP1 is extracted with the power supply voltage VDD.

The drive signals TGS and TGL are set to a low state in a short time, and the transfer transistors 21S and $21L_1$ to $21L_3$ are brought into a non-conductive state. The high/low state transition of the drive signals TGS and TGL is a shutter operation, and exposure starts in the light receiving element 20S and the light receiving elements $20L_1$ to $20L_3$.

At the time point $t_{sh}$, the drive signal ECG is set to a high state, the accumulation transistor 34 is brought into a conductive state, and the interpixel capacitance EC is reset.

The drive signal RST is set to a low state at the time point $t_7$, and the reset transistor 30 is brought into a non-conductive state. At the timing immediately before the time point $t_8$, the drive signals FDG and ECG are set to a low state, and the conversion efficiency switching transistor 31 and the accumulation transistor 34 are brought into a non-conductive state.

After a predetermined time from the time point $t_8$ in the SH row, the operation shifts to the operation of the RD row. The period from the time point $t_8$ in the SH row to the shift of the operation to the RD row is an exposure period.

An example of the potential of each unit in the exposure period is illustrated in the section (b) of each of FIGS. 8A, 8B, and 87C. Here, the period from immediately before the time point $t_8$ in the SH row of FIG. 7 to the time point to in the RD row is illustrated.

As illustrated in the section (b) of FIGS. 8A and 8B, photocharges generated in the light receiving elements $20L_1$ to $20L_3$ and 20S with light reception through exposure accumulate in SP1 and SP2, respectively. Charges are generated and accumulated in the floating diffusion layers FD1 and FD2 because of the influence of exposure. The charges accumulated in the floating diffusion layers FD1 and FD2 become noises with respect to the pixel signal. Further, as illustrated in the section (b) of FIG. 8C, for example, the photocharges overflowed from the light receiving elements $20L_1$ to $20L_3$ accumulate in the interpixel capacitance EC.

(Operation in RD Row)

Next, the operation in the RD row will be described. As described above, the time points $t_0$ to $t_8$ in the RD row do not have to match the time points $t_0$ to $t_8$ in the SH row.

In the RD row, immediately after the time point $t_0$, the drive signals SEL and FDG are set to a high state, and the selection transistor 33 and the conversion efficiency switching transistor 31 are brought into a conductive state. The high state of the drive signal SEL is maintained until immediately before the time point $t_7$. The drive signals RST, ECG, TGL, and TGS are in a low state during the period from the time point $t_0$ to the time point $t_1$, and the reset transistor 30, the accumulation transistor 34, and the transfer transistors $21L_1$ to $21L_3$ and 21S are in a non-conductive state.

An example of the potential of each unit in the period from when the drive signals SEL and FDG are set to a high state immediately after the time point $t_0$ to the time point $t_1$ is illustrated in the section (c) of FIG. 8A. There is no change in the state of SP1, and accumulation of photocharges is maintained. The conversion efficiency switching transistor 31 is brought into a conductive state by the drive signal FDG, and the floating diffusion layers FD1 and FD2 are coupled. Since the drive signal SEL is in a high state, the charges accumulated in the coupled floating diffusion layers FD1 and FD2 are converted into voltages and supplied to the vertical signal line VSL via the selection transistor 33 as the noise level N2 in the low conversion efficiency region.

At the time point $t_1$, the drive signal FDG is set to a low state, the conversion efficiency switching transistor 31 is brought into a non-conductive state, and the floating diffusion layers FD1 and FD2 are divided.

An example of the potential of each unit in the period from the time point $t_1$ to immediately before the drive signal TGL is set to a high state is illustrated in the section (d) of FIG. 8A. There is no change in the state of SP1, and accumulation of photocharges is maintained. Since the drive signal FDG is in a low state and the drive signal SEL is in a high state, the charges accumulated in the floating diffusion layer FD1 is converted into a voltage and supplied to the vertical signal line VSL via the selection transistor 33 as the noise level N1.

In the period from immediately before the time point $t_2$ to the time point t2, the drive signal TGL is set to a high state, the transfer transistors $21L_1$ to $21L_3$ are brought into a conductive state, and the photocharges accumulated in the light receiving elements $20L_1$ to $20L_3$ with exposure are transferred to the floating diffusion layer FD1. Since the drive signal SEL is in a high state, the photocharges accumulated in the floating diffusion layer FD1 is converted into a voltage and supplied to the vertical signal line VSL via the selection transistor 33 as the signal level S1 in the high conversion efficiency region.

An example of the potential of each unit in the period from the time point $t_2$ to the time point $t_3$ is illustrated in the section (e) of FIG. 8A. The photocharges transferred from the light receiving elements $20L_1$ to $20L_3$ accumulate in the floating diffusion layer FD1 with the transfer transistors $21L_1$ to $21L_3$ in a conductive state.

At the time point $t_3$, the drive signal FDG is set to a high state to bring the conversion efficiency switching transistor 31 into a conductive state, and the floating diffusion layers FD1 and FD2 are coupled. For a short period from the time point $t_3$, the drive signal TGL is set to a high state, and the transfer transistors $21L_1$ to $21L_3$ are brought into a conductive state. As a result, all the photocharges accumulated in the light receiving elements $20L_1$ to $20L_3$ are transferred to the coupled floating diffusion layers FD1 and FD2. Since the drive signal SEL is in a high state, the photocharges accumulated in the coupled floating diffusion layers FD1 and FD2 are converted into a voltage and supplied to the vertical signal line VSL via the selection transistor 33 as the signal level S2 in the low conversion efficiency region.

At this time, it is assumed that all the photocharges accumulated in the coupled floating diffusion layers FD1 and FD2 are swept out from the floating diffusion layers FD1 and FD2 after a predetermined time, for example, by the time point $t_4$.

An example of the potential of each unit from when the drive signal TGL at the time point $t_3$ is set to a low state to the time point $t_4$ is illustrated in the section (f) of FIG. 8A. In the section (e), a state in which the photocharges accumulated in SP1 are transferred to the coupled floating diffusion layers FD1 and FD2 is illustrated.

An example of the potential of each unit from the time point $t_4$ to immediately before the time point $t_5$ when the drive signal TGS is in a high state is illustrated in the section (c) of FIG. 8B. The photocharges accumulated in SP2 are maintained, and the charges accumulated in the coupled floating diffusion layers FD1 and FD2 are converted into a voltage and supplied to the vertical signal line VSL via the selection transistor 33 as the noise level N3.

The drive signal TGS is set to a high state immediately before the time point $t_5$ and set to a low state at the time point $t_5$. An example of the potential of each unit from the time point $t_5$ to the time point $t_6$ is illustrated in the section (d) of FIG. 8B. The photocharges accumulated in the light receiving element 20S are transferred to and accumulated in the coupled floating diffusion layers FD1 and FD2. Since the drive signal SEL is in a high state, the photocharges accumulated in the coupled floating diffusion layers FD1 and FD2 are converted into a voltage and supplied to the vertical signal line VSL via the selection transistor 33 as the signal level S3 from the low-sensitivity light receiving element 20S.

Immediately after the time point $t_6$, the drive signal ECG is set to a high state, and the accumulation transistor 34 is brought into a conductive state. The drive signal SEL is set to a low state a predetermined time before the time point $t_7$, and the selection transistor 33 is set to a non-conductive state. Further, immediately before the time point $t_7$ (after the drive signal SEL is set to a low state), the drive signal RST is set to a high state, and the reset transistor 30 is brought into a conductive state.

An example of the potential of each unit in a period from when the drive signal ECG is set to a high state to when the drive signal SEL is set to a low state in the period from the time point $t_6$ to the time point $t_7$ is illustrated in section (c) of FIG. 8C. The photocharges accumulated in the interpixel capacitance EC are transferred to the coupled floating diffusion layers FD1 and FD2 via the accumulation transistor 34. The floating diffusion layer FD1 is omitted in the section (c) of FIG. 8C and the section (d) to be described later. Since the drive signal SEL is in a high state, the photocharges accumulated in the coupled floating diffusion layers FD1 and FD2 are converted into a voltage and supplied to the vertical signal line VSL via the selection transistor 33 as the signal level S4 by the interpixel capacitance EC.

The drive signal RST is brought into a high state immediately before the time point $t_7$ and is brought into a low state at the time point $t_7$. As a result, the reset transistor 30 is brought into a conductive state immediately before the time point $t_7$, and the charges accumulated in the coupled floating diffusion layers FD1 and FD2 are extracted with the power supply voltage VDD. An example of the potential of each unit in the period when the drive signal SEL is in a high state in the period from the time point $t_7$ to the time point $t_8$ is illustrated in the section (d) of FIG. 8C. Since the drive signal SEL is in a high state, the charges accumulated in the interpixel capacitance EC and the coupled floating diffusion layers FD1 and FD2 are converted into a voltage and supplied to the vertical signal line VSL via the selection transistor 33 as the noise level N4 from the interpixel capacitance EC.

After the above-described operation of the RD row, the operation shifts to the operation of the SH row again.

(4-3. Modification of First Embodiment)

Next, a modification of the first embodiment will be described. The modification of the first embodiment is an example in which exposure with the sequence described with reference to FIGS. 7 and 8A to 8C (referred to as long-time exposure) and readout are performed, and then exposure with an exposure time shorter than the long-time exposure (referred to as short-time exposure) is performed.

More specifically, after the long-time exposure is performed, the short-time exposure is performed according to the above-described sequence. In the RD row, the drive signals RST, ECG, TGL, and TGS are each set to a low state, and the reset transistor 30, the accumulation transistor 34, and the transfer transistors 21S and $21L_1$ to $21L_3$ are each set to a non-conductive state. The drive signal SEL is set to a high state, and at the same time the FDG is set to a high state to couple the floating diffusion layers FD1 and FD2, and a noise level N5 is read out from the coupled floating diffusion layers FD1 and FD2.

Next, the drive signal TGL is set to a high state to bring the transfer transistors $21L_1$ to $21L_3$ into a conductive state, and the photocharges accumulated in the high-sensitivity light receiving elements $20L_1$ to $20L_3$ are transferred to the coupled floating diffusion layers FD1 and FD2. Then, the drive signal TGL is set to a low state to bring the transfer transistors $21L_1$ to $21L_3$ into a non-conductive state, and a signal level S5 is read out from the coupled floating diffusion layers FD1 and FD2.

In this case, the noise level N5 is acquired before the signal level S5. Thus, the processing of subtracting the noise level N5 from the signal level S5 may be executed by using CDS. The noise level N5 is subtracted from the signal level S5 with CDS to generate a pixel signal from the high-sensitivity light receiving elements $20L_1$ to $20L_3$.

A pixel signal obtained by subtracting the noise level N1 from the signal level S1, a pixel signal obtained by subtracting the noise level N2 from the signal level S2, a pixel signal obtained by subtracting the noise level N3 from the signal level S3, and a pixel signal obtained by subtracting the noise level N5 from the signal level S5 are combined to generate a final pixel signal. As a result, an image having excellent low illuminance characteristics, a wide dynamic range, and few artifacts of a moving subject can be configured.

Figure 9:
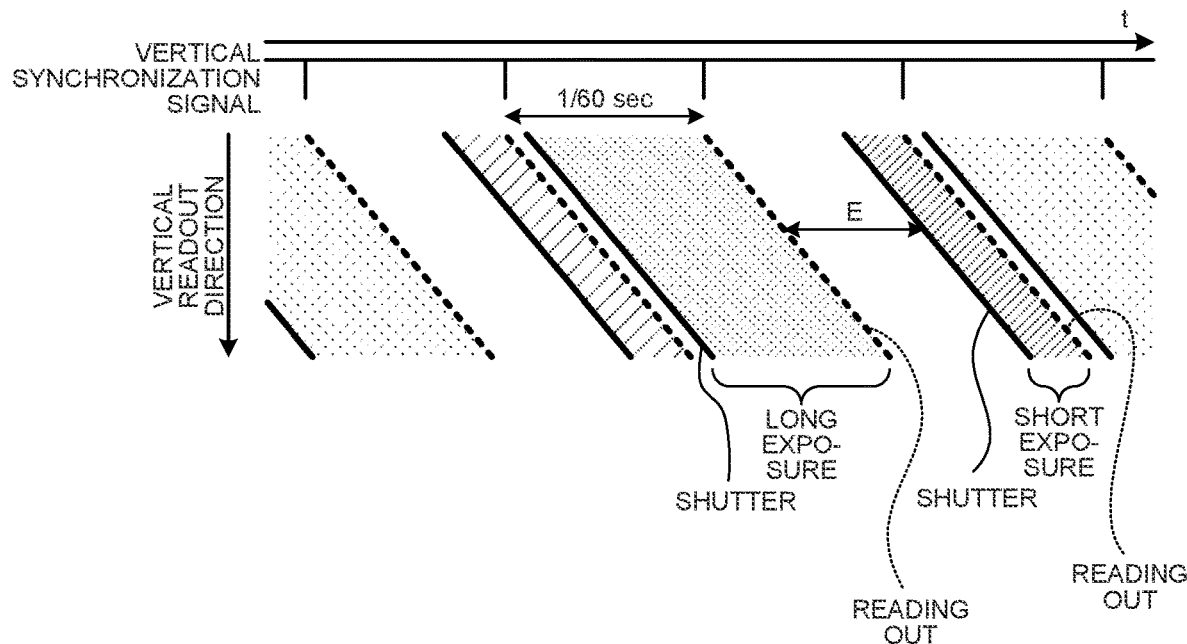
FIG. 9 is a schematic diagram for explaining an operation applicable to a modification of the first embodiment.

FIG. 9 is a schematic diagram for explaining an operation applicable to the modification of the first embodiment. In FIG. 9, the horizontal axis represents time, and the vertical axis represents each row in the pixel array unit 11 of the imaging sensor 10. The readout of each row is sequentially performed from the upper end row toward the lower end row as indicated as the vertical readout direction.

In the example of FIG. 9, according to a vertical synchronization signal supplied at an interval of ¹⁄₆₀ [sec], the long-time exposure (described as long exposure in the drawing) and the short-time exposure (described as short exposure in the drawing) are performed. For example, in the long-time exposure, the shutter operation by the SH row is performed for each row according to the vertical synchronization signal, and the readout operation by the RD row is performed for each row according to the next vertical synchronization signal. In the short-time exposure, the shutter operation is performed after a period E of a predetermined length has elapsed for each row from the vertical synchronization signal, and the readout operation is performed according to the vertical synchronization signal next to the current vertical synchronization signal. In this manner, the long-time exposure and the short-time exposure are alternately and repeatedly executed for each vertical synchronization signal. An image of one frame is generated every (1/60)×2=1/30 [sec].

Figure 10:
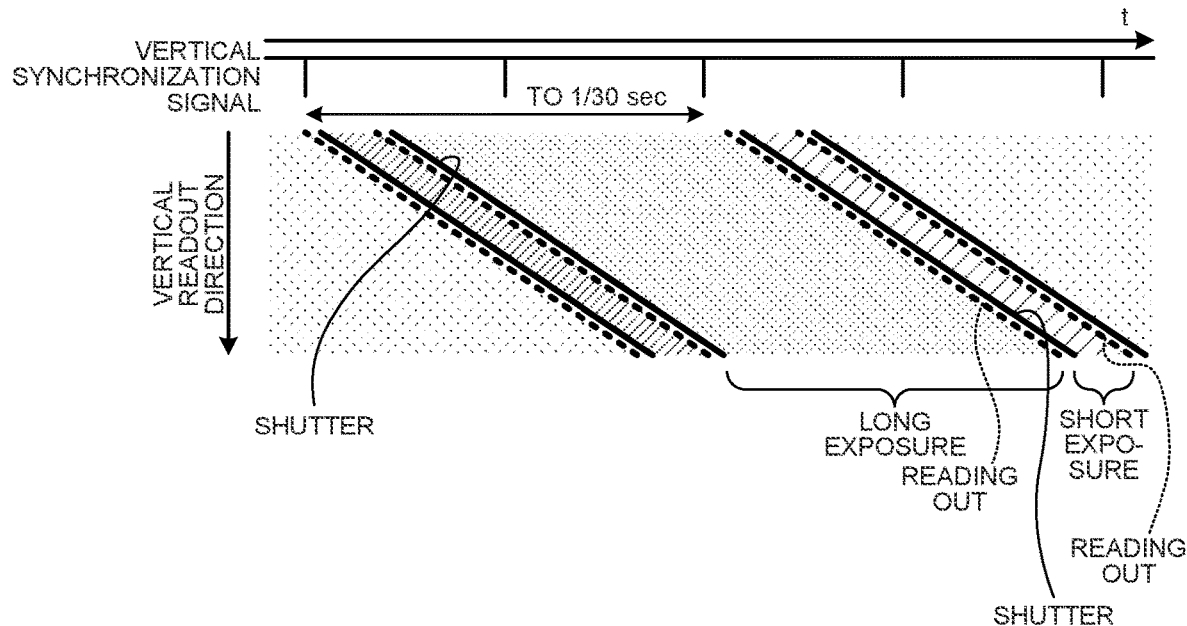
FIG. 10 is a schematic diagram for explaining another operation applicable to a modification of the first embodiment.

As another operation applicable to the modification of the first embodiment, the period E between the long-time exposure and the short-time exposure may be omitted by providing a line memory for short-time exposure in the imaging sensor 10, for example. FIG. 10 is a schematic diagram for explaining the other operation applicable to the modification of the first embodiment. A long-time exposure is performed for a sufficiently long time, and a short-time exposure is performed immediately after the long-time exposure like this. In this example, the long-time exposure and the short-time exposure are repeatedly executed in units of two vertical synchronization signals. An image of one frame is generated every 1/30 [sec], similarly to the example of FIG. 9.

An image from the pixel signal acquired through the long-time exposure and an image from the pixel signal acquired through the short-time exposure executed immediately after the long-time exposure are combined to form an image of one frame, whereby artifacts of a moving subject can be further reduced as compared with the example of FIG. 9.

(4-4. Example of Planar Layout and Stacked Structure of Unit Pixel Applicable to First Embodiment)

Figure 11A:
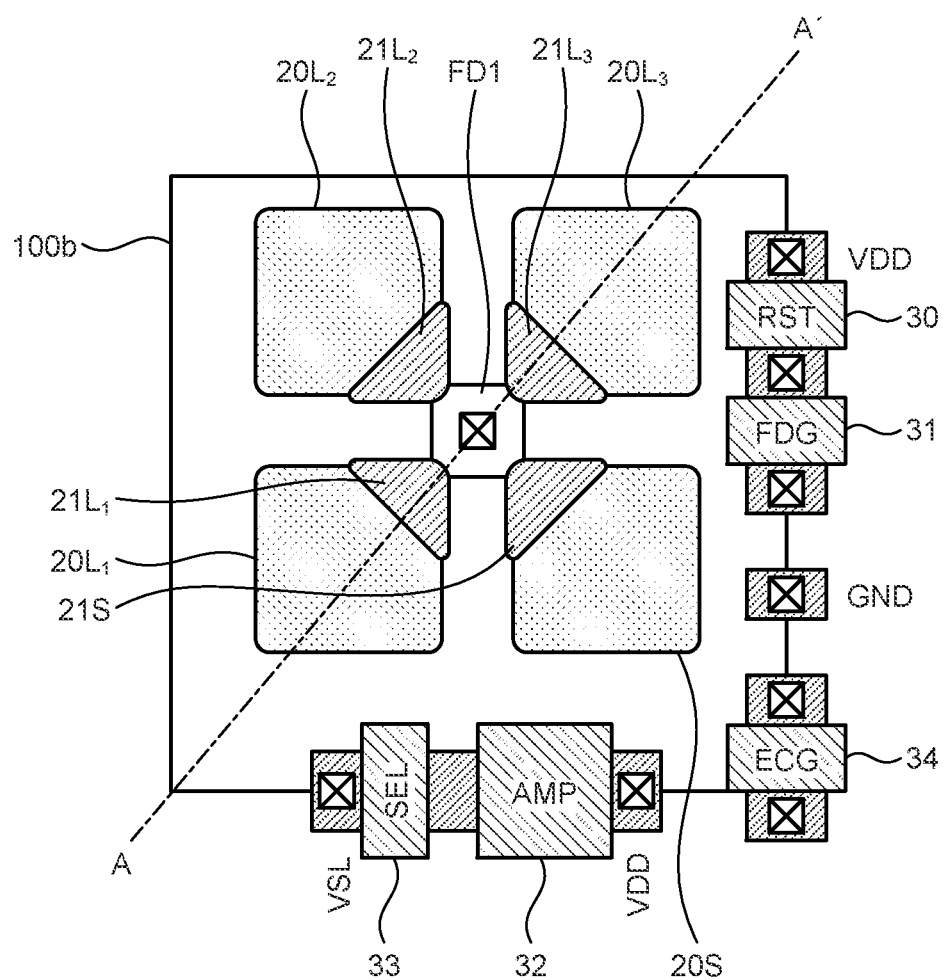
FIG. 11A is a schematic diagram depicting a first example of a planar layout of a unit pixel applicable to the first embodiment.

Next, an example of a planar layout and a stack structure of the unit pixel 100b applicable to the first embodiment will be described. FIG. 11A is a schematic diagram depicting a first example of a planar layout of the unit pixel 100b applicable to the first embodiment. FIG. 11A illustrates an example of a planar layout corresponding to the circuit of FIG. 5A described above.

As illustrated in FIG. 11A, the light receiving element 20S, the light receiving element 20L$_1$, the light receiving element 20L$_2$, and the light receiving element 20L$_3$ are arranged in the order of lower right, lower left, upper left, and upper right, for example. For the light receiving elements 20S, 20L$_1$, 20L$_2$, and 20L$_3$, the transfer transistors 21S, 21L$_1$, 21L$_2$, and 21L$_3$ are respectively arranged at positions where vertexes of the light receiving elements gather. The floating diffusion layer FD1 is arranged in contact with each of the transfer transistors 21S, 21L$_1$, 21L$_2$, and 21L$_3$.

In FIG. 11A, the reset transistor 30 and the conversion efficiency switching transistor 31 are arranged on the right side of the unit pixel 100b, and the amplification transistor 32 and the selection transistor 33 are arranged on the lower side. The accumulation transistor 34 is arranged at a position where the right side and the lower side of the unit pixel 100b are in contact with each other.

Figure 11B:
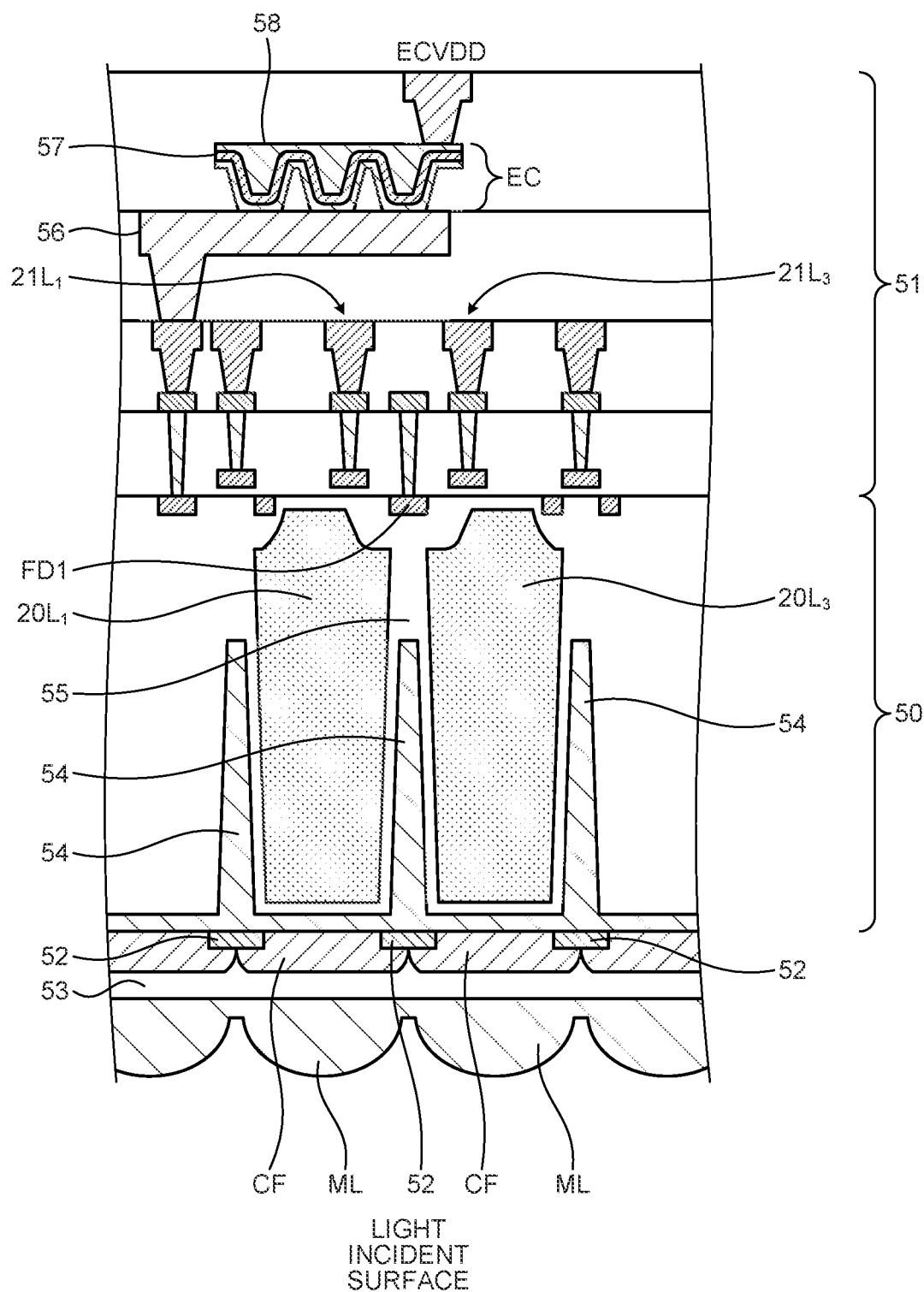
FIG. 11B is a schematic diagram depicting a first example of a section of the unit pixel applicable to the first embodiment.

FIG. 11B is a schematic diagram depicting a first example of a section of the unit pixel 100b applicable to the first embodiment. FIG. 11B illustrates an example of the A-A' cross section in FIG. 11A.

FIG. 11B illustrates a back-illuminated pixel structure, and the lower part of the drawing is the light incident surface. The upper surface of a semiconductor layer 50 is provided with a wiring layer S1. The semiconductor layer 50 is, for example, a p-type silicon substrate, and the light receiving elements 20L$_1$ and 20L$_3$ are made of an n-type semiconductor formed by ion implantation of a high-concentration impurity. The p-type semiconductor region functions as a device isolation part that isolates adjacent light receiving elements 20L$_1$ and 20L$_3$ from each other. The device isolation part is also constituted by a trench 54 formed from the light incident surface side and filled with an oxide film or a metal material.

On the surface of the semiconductor layer 50 on the light incident surface side, an oxide film or a metal film provided between adjacent light receiving elements constitutes an interpixel isolation part 52. A color filter CF is further provided for each light receiving element on the light incident surface side, and a microlens ML is provided for each light receiving element with a smoothing film 53 interposed therebetween.

The semiconductor layer 50 is provided with the floating diffusion layer FD1 on a surface in contact with the wiring layer 51. In the wiring layer 51, the transfer transistors 21L$_1$ and 21L$_3$ respectively corresponding to the light receiving elements 20L$_1$ and 20L$_3$ are provided. A lower electrode 56 of the interpixel capacitance EC is provided on the upper surface of the layer in which the transfer transistors 21L$_1$ and 21L$_3$ are provided.

With respect to the lower electrode 56 of the interpixel capacitance EC, an upper electrode 58 of the interpixel capacitance EC is provided, with an insulating film 57 interposed therebetween. Here, the interpixel capacitance EC is made to have a larger capacity by providing a protrusion on the lower electrode 56 to form an uneven structure. The upper electrode 58 of the interpixel capacitance EC is connected to the voltage ECVDD.

Figure 12A:
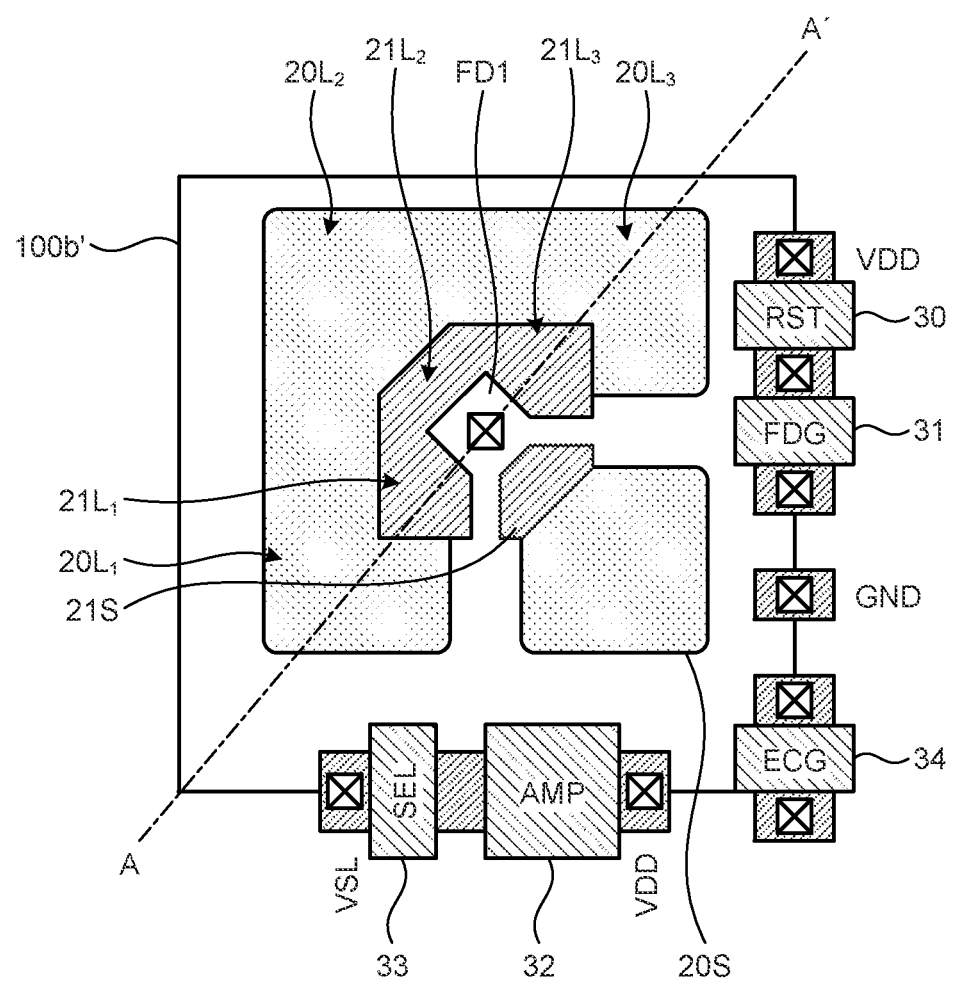
FIG. 12A is a schematic diagram depicting a second example of a planar layout of a unit pixel according to another example applicable to the first embodiment.

FIG. 12A is a schematic diagram depicting a second example of a planar layout of a unit pixel 100b' according to another example applicable to the first embodiment. FIG. 12A illustrates an example of a planar layout corresponding to the circuit of FIG. 5C described above. In the example of FIG. 12A, the unit pixel 100b' includes the light receiving element 20L$_1$, the light receiving element 20L$_2$, and the light receiving element 20L$_3$ that are joined, and the transfer transistors 21L$_1$, 21L$_2$, and 21L$_3$ that are also joined. In FIG. 12A, since the arrangement of the reset transistor 30, the conversion efficiency switching transistor 31, the amplification transistor 32, the selection transistor 33, and the accumulation transistor 34 is the same as the arrangement in FIG. 11A described above, and thus the description thereof is omitted here.

Figure 12B:
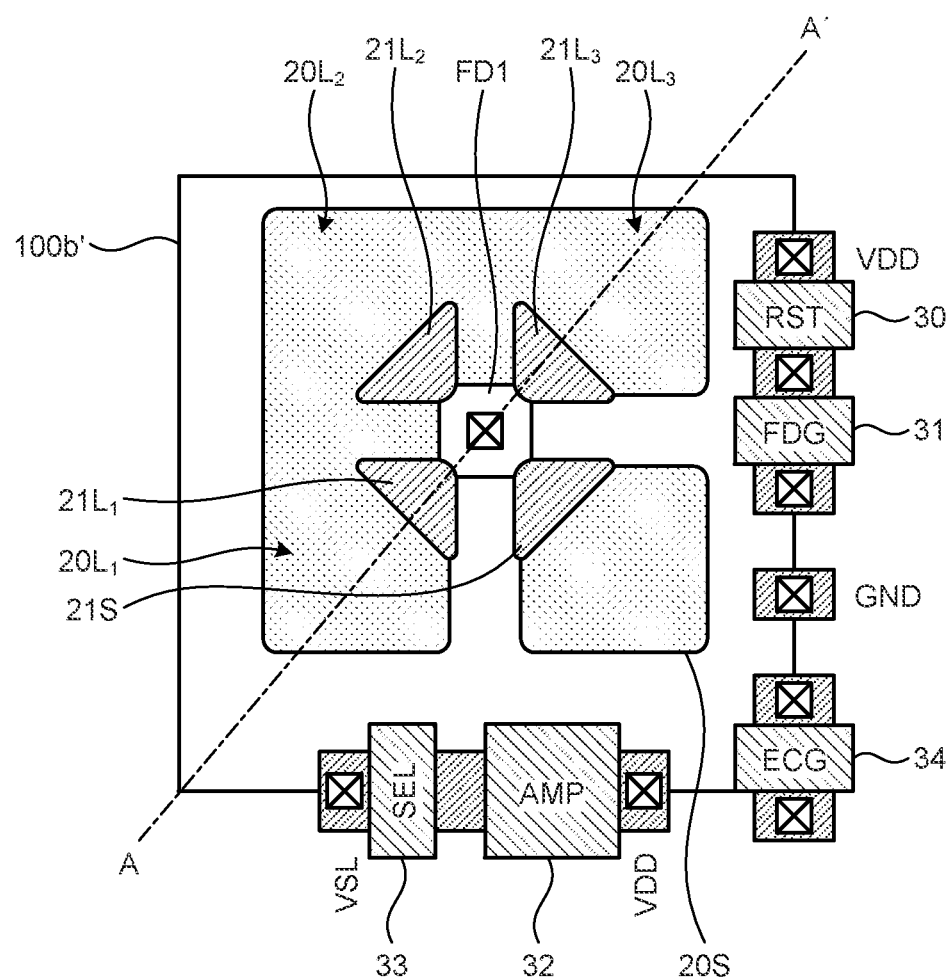
FIG. 12B is a schematic diagram depicting a third example of a planar layout of a unit pixel according to another example applicable to the first embodiment.

FIG. 12B is a schematic diagram depicting a third example of a planar layout of the unit pixel 100b' according to another example applicable to the first embodiment. FIG. 12B illustrates an example of a planar layout corresponding to the circuit of FIG. 5C described above. In the unit pixel 100b' of the example in FIG. 12B, the light receiving element 20L$_1$, the light receiving element 20L$_2$, and the light receiving element 20L$_3$ are joined. On the other hand, the transfer transistors 21L$_1$, 21L$_2$, and 21L$_3$ are independently configured from each other.

Figure 12C:
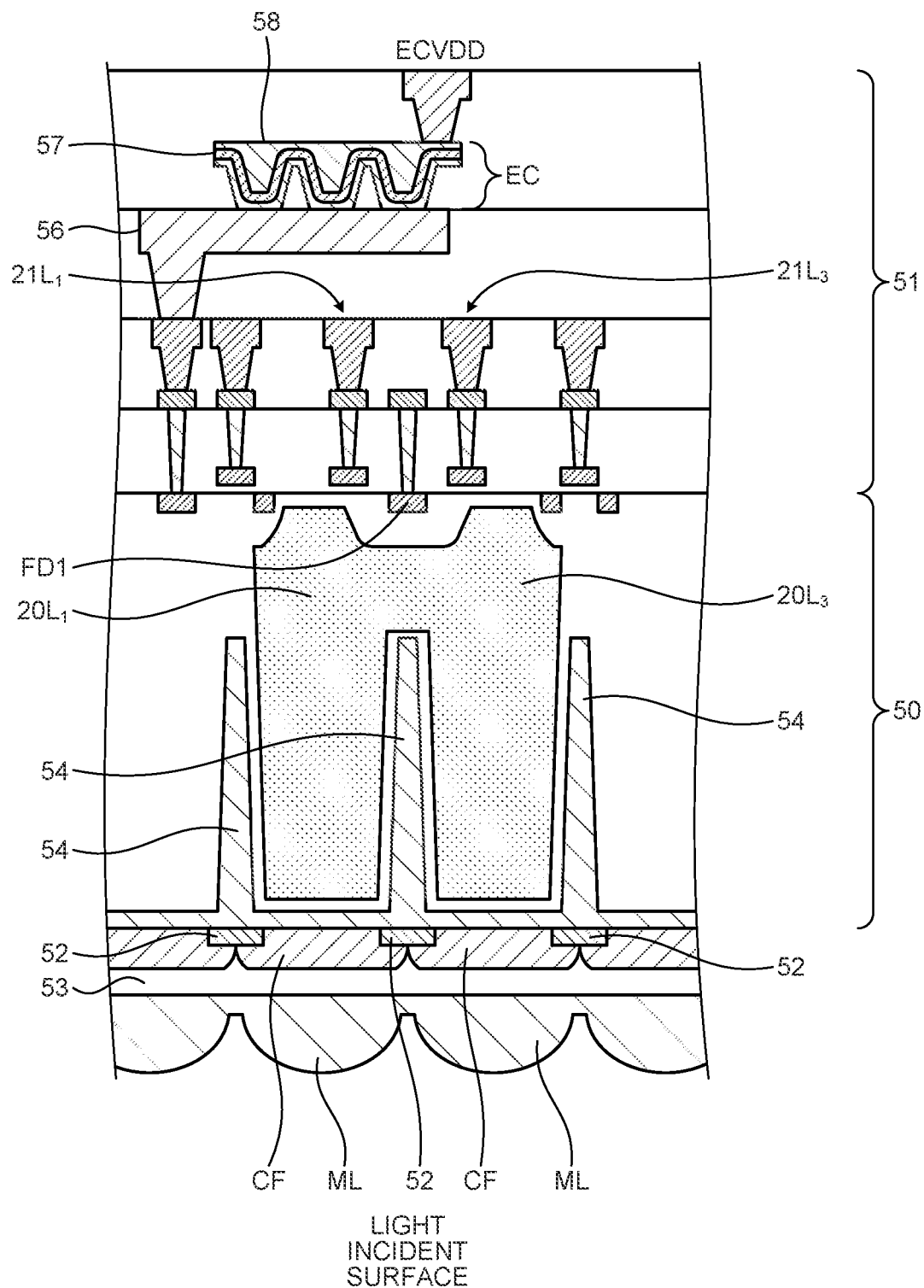
FIG. 12C is a schematic diagram depicting a second example of a section of the unit pixel according to another example applicable to the first embodiment.

FIG. 12C is a schematic diagram depicting a second example of a section of the unit pixel 100b' according to another example applicable to the first embodiment. The sectional view illustrated in FIG. 12C is common to the planar layouts of FIGS. 12A and 12B, and FIG. 12C illustrates an example of the A-A' section in FIGS. 12A and 12B. As illustrated in FIG. 12C, the unit pixel 100b' is configured by joining the light receiving element 20L$_1$ and the light receiving element 20L$_3$ between the bottom of the trench 54 and the wiring layer 51. The other portions are the same as those in FIG. 11B described above, and thus the description thereof is omitted here.

5. Second Embodiment of Present Disclosure

Next, a second embodiment of the present disclosure will be described. The second embodiment is an example in which a path capable of directly transferring the photocharges generated in the low-sensitivity light receiving element 20S to the interpixel capacitance EC without merging them with the photocharges generated in the high-sensitivity light receiving elements 20L1 to 21L3 is provided to the configuration described with reference to FIG. 5A.

(5-1. Configuration Example According to Second Embodiment)

Figure 13:
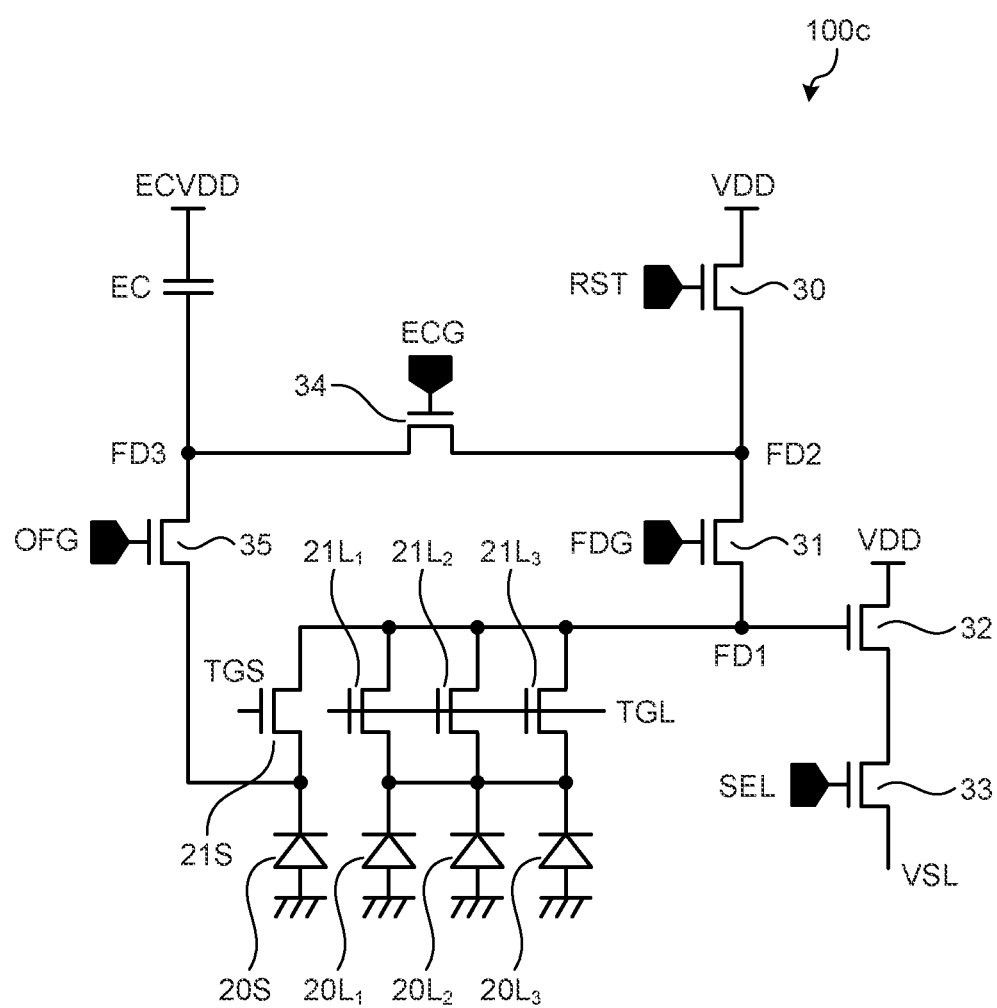
FIG. 13 is a schematic diagram depicting an example of a circuit configuration of a unit pixel according to a second embodiment.

FIG. 13 is a schematic diagram illustrating an example of a circuit configuration of a unit pixel according to the second embodiment. Hereinafter, a description will be given focusing on a portion different from the configuration of FIG. 5A. In a unit pixel 100c in FIG. 13, an OFG transistor 35 (fifth transistor) is additionally provided to the unit pixel 100b in FIG. 5A. The OFG transistor 35 is an n-type depletion type MOS transistor. In the OFG transistor 35, the drain is connected to the floating diffusion layer FD3, and the source is connected to a connection point connecting the cathode of the low-sensitivity light receiving element 20S and the source of the transfer transistor 21S. The drive signal OFG is always in a low state in both operations of the SH row and the RD row.

According to the configuration illustrated in FIG. 13, in the unit pixel 100c, the photocharges overflowed from the light receiving element 20S is transferred to the interpixel capacitance EC via the OFG transistor 35 and the floating diffusion layer FD3. Since the OFG transistor 35 is a depletion type MOS transistor, the photocharges overflowed from the light receiving element 20S is transferred to the interpixel capacitance EC even when the drive signal OFG is in a low state. This configuration is complicated with respect to the configuration of FIG. 5A, but the drive control becomes easy with this configuration.

In FIG. 13, the cathodes of the light receiving elements $20L_1$ to $20L_3$ are connected to each other, and the photocharges of the light receiving elements $20L_1$ to $20L_3$ are merged and transferred. The connection between the cathodes of the light receiving elements $20L_1$ to $20L_3$ may be omitted.

(5-2. Method for Driving Pixel According to Second Embodiment)

FIG. 14 is a sequence diagram illustrating each drive signal for driving the unit pixel 100c according to the second embodiment. Since the meaning of each unit in FIG. 14 is the same as that of each unit in FIG. 7 described above, the description thereof will be omitted here.

The sequence illustrated in FIG. 14 is different from the sequence of FIG. 7 described above in that the drive signal RST is brought into a high state for a short time at the time point $t_{10}$ immediately after the time point to in the operation of the RD row. In addition, since the OFG transistor 35 is of a depletion type, charges can pass between the drain and the source even when the drive signal OFG input to the gate is in a low state and the transistor is in a non-conductive state.

Figure 15A:
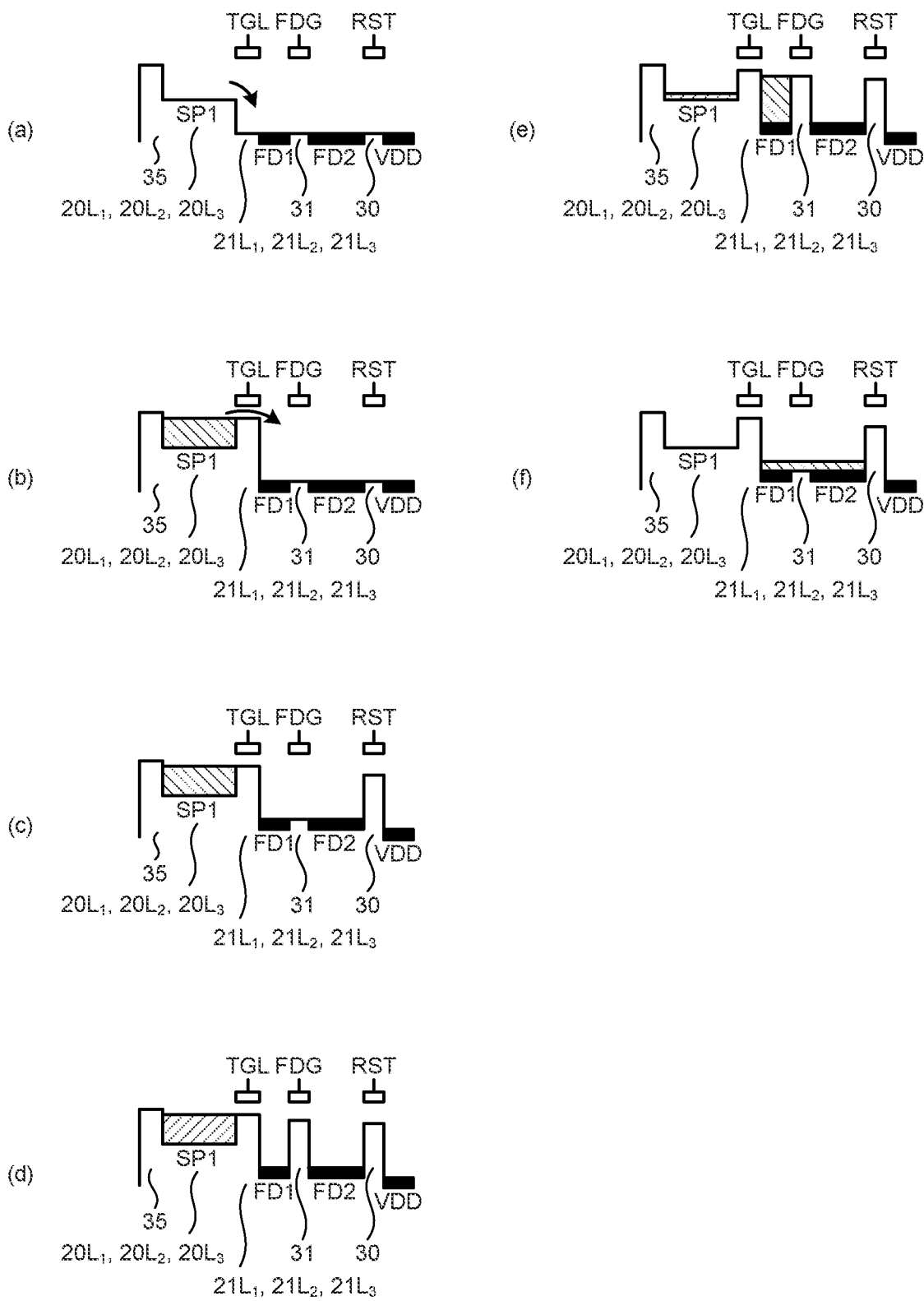
FIG. 15A is a schematic diagram depicting an example of potential transition of each unit regarding the operation of a high-sensitivity light receiving element according to the second embodiment.

FIGS. 15A, 15B, and 15C are schematic diagrams respectively illustrating examples of potential transition of each unit regarding the operation of the high-sensitivity light receiving elements $20L_1$ to $20L_3$, the low-sensitivity light receiving element 20S, and the interpixel capacitance EC according to the second embodiment. The meaning of each unit in FIGS. 15A to 15C is the same as that of each unit in FIGS. 15A to 15C described above, and thus the description thereof is omitted here.

(Operation in SH Row)

First, the operation in the SH row will be described. In the SH row, the drive signals TGL and TGS are set to a high state at the time point $t_{sh}$ immediately after the time point $t_6$. This causes the transfer transistors 21S and $21L_1$ to $21L_3$ to be conductive and the light receiving elements 20S and $20L_1$ to $20L_3$ to be reset.

At the time point $t_{sh}$, the drive signal ECG is set to a high state, the accumulation transistor 34 is brought into a conductive state, and the interpixel capacitance EC is reset.

Examples of the potential of each unit at the time point $t_{sh}$ are illustrated in the section (a) of FIG. 15A, the section (a) of FIG. 15B, and the section (a) of FIG. 15C. As illustrated in the section (a) of FIG. 15A, the transfer transistors $21L_1$ to $21L_3$, the conversion efficiency switching transistor 31, and the reset transistor 30 are brought into a conductive state, and the charges of SP1 is extracted with the power supply voltage VDD.

The drive signals TGS and TGL are set to a low state in a short time, and the transfer transistors 21S and $21L_1$ to $21L_3$ are brought into a non-conductive state. The high/low state transition of the drive signals TGS and TGL is a shutter operation, and exposure starts in the light receiving element 20S and the light receiving elements $20L_1$ to $20L_3$. A period from when the exposure is started to when the operation shifts to the RD row is set as an exposure period.

The drive signal RST is set to a low state at the time point $t_7$, and the reset transistor 30 is brought into a non-conductive state. At the timing immediately before the time point $t_8$, the drive signals FDG and ECG are set to a low state, and the conversion efficiency switching transistor 31 and the accumulation transistor 34 are brought into a non-conductive state.

An example of the potential of each unit in the exposure period is illustrated in the section (b) of each of FIGS. 15A, 15B, and 15C. Here, a period from when the drive signals TGL and TGS, which are in a high state at the time point $t_{sh}$ in FIG. 14, are in a low state to the time point $t_7$ when the drive signal RST is in brought into a low state is illustrated.

As illustrated in the section (b) of FIGS. 15A and 15B, the photocharges generated in the light receiving elements $20L_1$ to $20L_3$ and 20S with light reception through exposure accumulate in SP1 and SP2. As illustrated in the section (b) of FIG. 15C, the photocharges overflowed from the light receiving elements $20L_1$ to $20L_3$ are also transferred to the floating diffusion layer FD3 and the interpixel capacitance EC via the OFG transistor 35. The photocharges overflowed from the light receiving elements $20L_1$ to $20L_3$ also transfer to the floating diffusion layer FD1 via the transfer transistors $21L_1$ to $21L_3$ as illustrated in the section (b) of FIG. 15A. Further, since the drive signal RST is in a high state and the reset transistor 30 is in a conductive state, charges generated by the influence of exposure in the floating diffusion layers FD1 and FD2 are extracted with the power supply voltage VDD via the reset transistor 30.

(Operation in RD Row)

Next, the operation in the RD row will be described. In the RD row, at the time point $t_{10}$ immediately after the time point to, the drive signals SEL, FDG, and RST are set to a high state, and the selection transistor 33, the conversion efficiency switching transistor 31, and the reset transistor 30 are brought into a conductive state. The drive signal RST is brought into a low state in a short time, and the reset transistor 30 is brought into a non-conductive state.

The high state of the drive signal SEL is maintained until immediately before the time point $t_7$. The drive signals ECG, TGL, and TGS are in a low state during the period from the time point $t_0$ to the time point $t_1$, and the accumulation transistor 34 and the transfer transistors $21L_1$ to $21L_3$ and 21S are in a non-conductive state.

An example of the potential of each unit in the period from when the drive signals SEL, FDG, and RST are brought into a high state at the time point $t_{10}$ and the drive signal RST is brought into a low state immediately after that until the time point $t_1$ is illustrated in the section (c) in FIG. 15A. There is no change in the state of SP1, and accumulation of photocharges is maintained. The conversion efficiency switching transistor 31 is brought into a conductive state by the drive signal FDG, and the floating diffusion layers FD1 and FD2 are coupled. Since the drive signal RST is set to a high state at the time point $t_{10}$ and the reset transistor 30 is once in a conductive state, the charges generated by the leak and accumulated in the coupled floating diffusion layers FD1 and FD2 are extracted with the power supply voltage VDD. As a result, only charges in the initial state are present in the coupled floating diffusion layers FD1 and FD2. Since the drive signal SEL is in a high state, the charges present in the coupled floating diffusion layers FD1 and FD2 are converted into a voltage and supplied to the vertical signal line VSL via the selection transistor 33 as the noise level N2 in the low conversion efficiency region.

At the time point $t_1$, the drive signal FDG is set to a low state, the conversion efficiency switching transistor 31 is brought into a non-conductive state, and the floating diffusion layers FD1 and FD2 are divided.

An example of the potential of each unit in the period from the time point $t_1$ to immediately before the drive signal TGL is brought into a high state is illustrated in the section (d) of FIG. 15A. There is no change in the state of SP1, and accumulation of photocharges is maintained. Since the drive signal FDG is in a low state and the drive signal SEL is in a high state, the charges present in the floating diffusion layer FD1 are converted into a voltage and supplied to the vertical signal line VSL via the selection transistor 33 as the noise level N1. Here, at the time point $t_{10}$, the drive signal RST is set to a high state, the reset transistor 30 is brought into a conductive state, and charges are extracted from the floating diffusion layers FD1 and FD2. Thus, the noise level N1 is lower than the noise level N1 in the first embodiment.

In the period from immediately before the time point $t_2$ to the time point $t_2$, the drive signal TGL is set to a high state, the transfer transistors $21L_1$ to $21L_3$ are brought into a conductive state, and the photocharges accumulated in the light receiving elements $20L_1$ to $20L_3$ through exposure are transferred to the floating diffusion layer FD1. Since the drive signal SEL is in a high state, the photocharges accumulated in the floating diffusion layer FD1 is converted into a voltage and supplied to the vertical signal line VSL via the selection transistor 33 as the signal level S1 in the high conversion efficiency region.

An example of the potential of each unit in the period from the time point $t_2$ to the time point $t_3$ is illustrated in the section (e) of FIG. 15A. The photocharges transferred from the light receiving elements $20L_1$ to $20L_3$ accumulate in the floating diffusion layer FD1 with the transfer transistors $21L_1$ to $21L_3$ in a conductive state.

At the time point $t_3$, the drive signal FDG is set to a high state to bring the conversion efficiency switching transistor 31 into a conductive state, and the floating diffusion layers FD1 and FD2 are coupled. For a short period from the time point $t_3$, the drive signal TGL is set to a high state, and the transfer transistors $21L_1$ to $21L_3$ are brought into a conductive state. As a result, all the photocharges accumulated in the light receiving elements $20L_1$ to $20L_3$ are transferred to the coupled floating diffusion layers FD1 and FD2. Since the drive signal SEL is in a high state, the photocharges accumulated in the coupled floating diffusion layers FD1 and FD2 are converted into a voltage and supplied to the vertical signal line VSL via the selection transistor 33 as the signal level S2 in the low conversion efficiency region.

At this time, it is assumed that all the photocharges accumulated in the coupled floating diffusion layers FD1 and FD2 are swept out from the floating diffusion layers FD1 and FD2 after a predetermined time, for example, by the time point $t_4$.

An example of the potential of each unit from when the drive signal TGL at the time point $t_3$ is set to a low state to the time point $t_4$ is illustrated in the section (f) of FIG. 15A. In the section (e), a state in which the photocharges accumulated in SP1 are transferred to the coupled floating diffusion layers FD1 and FD2 is illustrated.

An example of the potential of each unit from the time point $t_4$ to immediately before the time point $t_5$ when the drive signal TGS is brought into a high state is illustrated in the section (c) of FIG. 15B. The photocharges accumulated in SP2 are maintained, and the charges accumulated in the coupled floating diffusion layers FD1 and FD2 are converted into a voltage and supplied to the vertical signal line VSL via the selection transistor 33 as the noise level N3. Here, at the time point $t_{10}$, the drive signal RST is set to a high state, the reset transistor 30 is brought into a conductive state, and charges are extracted from the floating diffusion layers FD1 and FD2. Thus, the noise level N3 is a lower level than the noise level N3 in the first embodiment.

The drive signal TGS is set to a high state immediately before the time point $t_5$ and set to a low state at the time point $t_5$. An example of the potential of each unit from the time point $t_5$ to the time point $t_6$ is illustrated in the section (d) of FIG. 15B. The photocharges accumulated in the light receiving element 20S are transferred to and accumulated in the coupled floating diffusion layers FD1 and FD2. Since the drive signal SEL is in a high state, the photocharges accumulated in the coupled floating diffusion layers FD1 and FD2 are converted into a voltage and supplied to the vertical signal line VSL via the selection transistor 33 as the signal level S3 from the low-sensitivity light receiving element 20S.

Immediately after the time point $t_6$, the drive signal ECG is set to a high state, and the accumulation transistor 34 is brought into a conductive state. The drive signal SEL is set to a low state a predetermined time before the time point $t_7$, and the selection transistor 33 is set to a non-conductive state. Further, immediately before the time point $t_7$ (after the drive signal SEL is set to a low state), the drive signal RST is set to a high state, and the reset transistor 30 is brought into a conductive state.

An example of the potential of each unit in the period from when the drive signal ECG is set in a high state to when the drive signal SEL is set to a low state in the period from the time point $t_6$ to the time point $t_7$ is illustrated in the section (c) of FIG. 15C. The photocharges accumulated in the floating diffusion layer FD3 and the interpixel capacitance EC are transferred to the coupled floating diffusion layers FD1 and FD2 via the accumulation transistor 34. The floating diffusion layer FD1 is omitted in the section (c) of FIG. 15C and the section (d) to be described later. Since the drive signal SEL is in a high state, the photocharges accumulated in the coupled floating diffusion layers FD1 and FD2 are converted into a voltage and supplied to the vertical signal line VSL via the selection transistor 33 as the signal level S4 from the floating diffusion layers FD3 and the interpixel capacitance EC.

Here, as described in the section (b) of FIG. 15A and the section (b) of FIG. 15C, the photocharges overflowed from the light receiving elements $20L_1$ to $20L_3$ at the time of exposure are already accumulated in the interpixel capacitance EC. Thus, the signal level S4 here is a higher level than the signal level S4 in the first embodiment.

The drive signal RST is brought into a high state immediately before the time point $t_0$ and is brought into a low state at the time point $t_7$. As a result, the reset transistor 30 is brought into a conductive state immediately before the time point $t_7$, and the charges accumulated in the coupled floating diffusion layers FD1 and FD2 are extracted with the power supply voltage VDD. An example of the potential of each unit in the period when the drive signal SEL is in a high state in the period from the time point $t_7$ to the time point $t_8$ is illustrated in the section (d) of FIG. 15C. Since the drive signal SEL is in a high state, the charges accumulated in the floating diffusion layer FD3, the interpixel capacitance EC, and the coupled floating diffusion layers FD1 and FD2 are converted into a voltage and supplied to the vertical signal line VSL via the selection transistor 33 as the noise level N4 from the interpixel capacitance EC.

After the above-described operation of the RD row, the operation shifts to the operation of the SH row again.

6. Effects

Next, effects according to each embodiment of the present disclosure will be described. In the above-described first embodiment and the modifications thereof and the second embodiment, the interpixel capacitance EC is provided in the unit pixel 100*b* or the unit pixel 100*c*, and the light receiving elements $20L_1$ to $20L_3$ having a high sensitivity to light and the light receiving element 20S having a low sensitivity to light are provided. This prevents the SNR from decreasing at a junction between the SNR characteristic of the light receiving elements $20L_1$ to $20L_3$ and the SNR characteristic of the light receiving element 20S as indicated by the dip E in FIG. 6. Further, as indicated by the dip F in FIG. 6, the SNR is also prevented from decreasing at a junction between the SNR characteristic of the light receiving element 20S and the SNR characteristic of the interpixel capacitance EC. Thus, image quality degradation in the intermediate gradation of the image can be prevented, and a larger dynamic range can be realized.

The second embodiment, in which a path for directly transferring the photocharges overflowed from the low-sensitivity light receiving element 20S to the interpixel capacitance EC is provided, can be controlled more easily than the first embodiment.

Each embodiment of the present disclosure is suitable for use in a vehicle-mounted image sensor. In recent years, in a vehicle-mounted image sensor, attention has been paid to the fact that a phenomenon called "LED flicker" occurs in which a blinking subject such as a light emitting diode (LED) light source cannot be imaged depending on the blinking timing.

This LED flicker is a problem caused by the existing image sensor because the dynamic range is narrow and it is necessary to adjust the exposure time for each subject. In an existing image sensor, to deal with subjects with various levels of illuminance, exposure time is set to be long for a low-illuminance subject and short for a high-illuminance subject. This makes it possible to deal with various subjects with a narrow dynamic range.

On the other hand, since the readout speed is constant regardless of the exposure time, when the exposure time is set in a unit shorter than the readout time, light incident on a light receiving element such as a photodiode at a time other than the exposure time is converted into charges through photoelectric conversion, but the light is not subjected to charge-voltage conversion and then discarded. Thus, blinking of the LED light source in the invalid period (time other than the exposure time) cannot be imaged. This is a phenomenon called LED flicker. In recent years, traffic lights, headlights of vehicles, and the like have been shifting to those with LED light sources, and if these lights cannot be imaged by a drive recorder or the like because of the LED flicker, there will be a high possibility of causing a problem.

To deal with the LED flicker, it is necessary to expand the dynamic range of imaging. That is, for example, by setting the exposure time to a time longer than the blinking period of an LED light source, the blinking LED light source can be imaged. On the other hand, when the exposure time is extended, the light receiving element is saturated when a high-illuminance subject is imaged, and so-called "blown-out highlights" or the like may occur. The blown-out highlights with a high-illuminance subject can be avoided by lowering the light receiving sensitivity of the light receiving element, but then it becomes difficult to image a low-illuminance subject, that is, a dark scene.

Various dynamic range expansion technologies have been conventionally known. For example, a method using a sensitivity ratio with time division disclosed in JP 4973115 B and the like, a method using a sensitivity ratio with space division disclosed in JP 3071891 B and the like, are known. In these methods using time division and space division, the dynamic range can be expanded to 120 [dB] or more, which is said to be the same as human eyes, by increasing the number of divisions. On the other hand, artifacts and degradation of resolutions of moving subjects cannot be avoided. In addition, simple time division does not always deal with the LED flicker.

On the other hand, as disclosed in JP 4317115 B, there is a method of providing a capacitance in a pixel to directly increase the amount of charges to handle. A method of combining a method of providing a capacitance in a pixel and a method of using a sensitivity ratio with space division is also proposed as disclosed in US 2018/0241955 A.

The method of combining a method of using a sensitivity ratio with space division and a method of providing a capacitance in a pixel to directly increase the amount of charges to handle as disclosed in US 2018/0241955 A is suitable for expanding the dynamic range while dealing with the LED flicker. However, since it is necessary to make a photodiode having a large size and a photodiode having a small size, the number of production steps increases. Further, in the case of miniaturizing pixels, it is technically and cost-effectively difficult to make large and small photodiodes in the first place.

Thus, in miniaturization of pixels, a method of extremely increasing the amount of charges to handle in an interpixel capacitance by using a production process of a dynamic random access memory (DRAM) based on the technology disclosed in JP 4317115 B has been studied. On the other hand, when the capacity is excessively increased, the conversion efficiency is reduced, and thus, as described with reference to FIG. 4, the SNR is greatly reduced at the joint of the SNR characteristic, and the image quality in the intermediate gradation deteriorates.

In each embodiment of the present disclosure, as described above, the interpixel capacitance EC is provided in the unit pixel 100*b* or the unit pixel 100*c*, and the light receiving elements $20L_1$ to $20L_3$ having a high sensitivity to light and the light receiving element 20S having a low sensitivity to light are provided. This configuration prevents the SNR from decreasing in each of the joint between the SNR characteristic of the light receiving elements $20L_1$ to $20L_3$ and the SNR characteristic of the light receiving element 20S and the joint between the SNR characteristic of the light receiving element 20S and the SNR characteristic of the interpixel capacitance EC, as indicated by the dips E and F in FIG. 6. Therefore, it is possible to prevent image quality deterioration in the intermediate gradation of the image, realize a wider dynamic range, and deal with the LED flicker.

In the above description, four light receiving elements are provided for the unit pixel, one light receiving element among the four light receiving elements has a low sensitivity, and the other three light receiving elements have a high sensitivity, but the present disclosure is not limited to this example. For example, the number of light receiving elements provided in the unit pixel is not limited to four, and the number may be three or five or more. The number of low-sensitivity light receiving elements among the plurality of light receiving elements provided in the unit pixel is not limited to one, and it may be two or more. That is, two light receiving units each including a plurality of light receiving elements may be provided in the unit pixel, and one of the two light receiving units may have a low sensitivity and the other light receiving unit may have a high sensitivity.

Further, in the above description, the sizes of the plurality of light receiving elements included in the unit pixel are substantially the same, but the present disclosure is not limited to this example. That is, the sizes of the plurality of light receiving elements included in the unit pixel may be different from each other.

7. Third Embodiment of Present Disclosure (7-1. Application Example of Technology of Present Disclosure)

Figure 16:
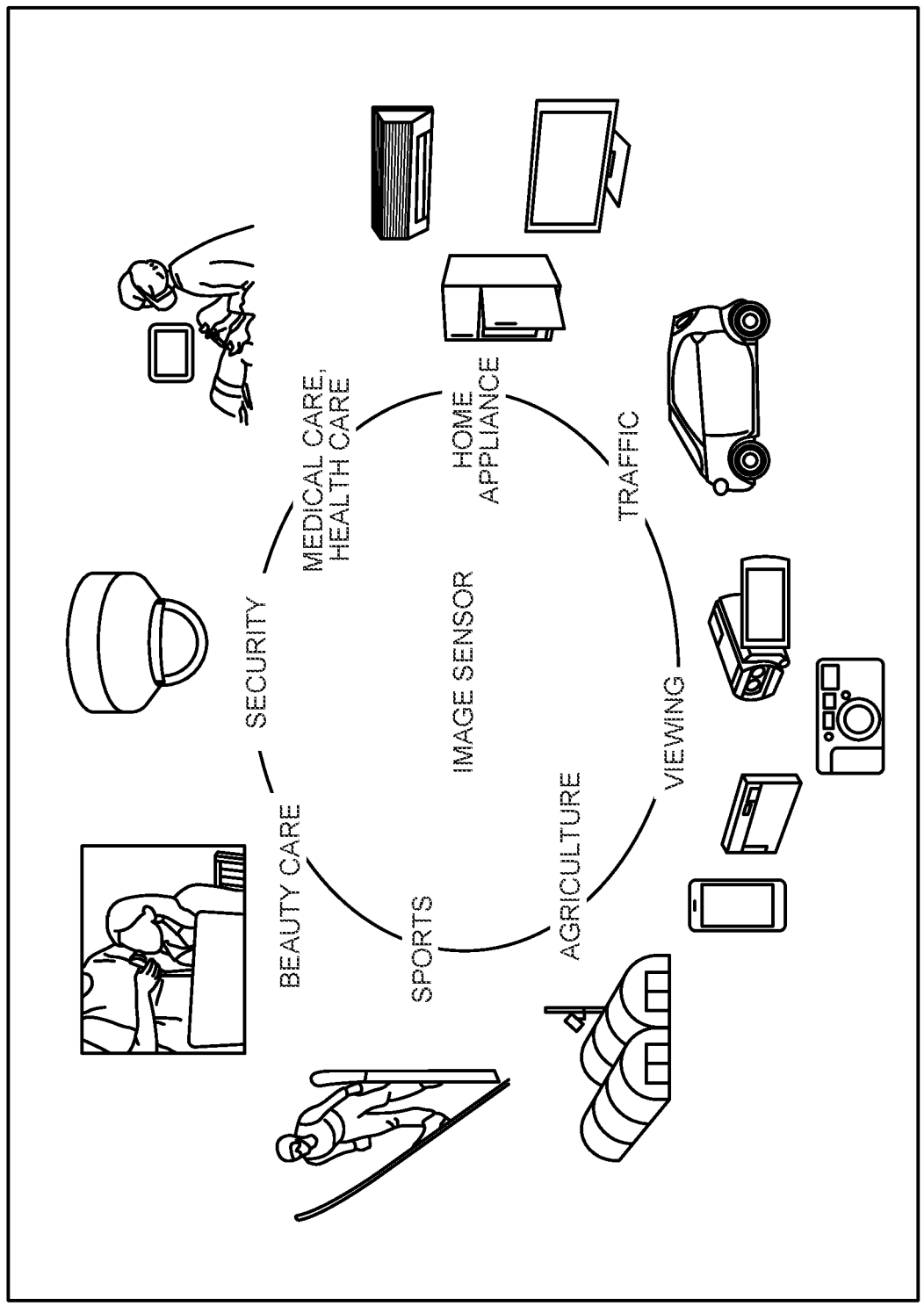
FIG. 16 is a diagram depicting a usage example of an imaging device to which the technology of the present disclosure is applied.

Next, as a third embodiment, application examples of an imaging sensor according to the first embodiment and its modifications and the second embodiment according to the present disclosure will be described. FIG. 16 is a diagram depicting a usage example of the imaging sensor according to the first embodiment and each modification thereof and the second embodiment described above.

The above-described imaging sensor 10 may be used, for example, in various cases of sensing light such as visible light, infrared light, ultraviolet light, and X-rays as described below.

Devices that capture an image to be used for viewing, such as digital cameras and portable devices with camera function.

Devices used for traffic, such as vehicle-mounted sensors that capture images of the front, rear, surroundings, inside, and the like of an automobile for safe driving, for example for automatic stop, and for recognition of a driver's condition, monitoring cameras that monitor traveling vehicles and roads, and distance measuring sensors that measure a distance between vehicles and the like.

Devices used for home appliances such as TVs, refrigerators, and air conditioners to capture an image of a gesture of a user and perform device operation according to the gesture.

Devices used for medical care or health care, such as endoscopes and devices that perform angiography with reception of infrared light.

Devices used for security, such as monitoring cameras for crime prevention or cameras for person authentication.

Devices used for beauty care, such as skin measuring instrument for photographing skin or microscopes for photographing a scalp.

Devices used for sports, such as action cameras and wearable cameras for sports and the like.

Devices used for agriculture, such as cameras for monitoring conditions of fields and crops.

(7-2. Application Example to Mobile Body)

Next, further application examples of the technology according to the present disclosure will be described. The technology according to the present disclosure may be further applied to a device mounted on any type of mobile body such as an automobile, an electric vehicle, a hybrid electric vehicle, a motorcycle, a bicycle, a personal mobility, an airplane, a drone, a vessel, and a robot.

Figure 17:
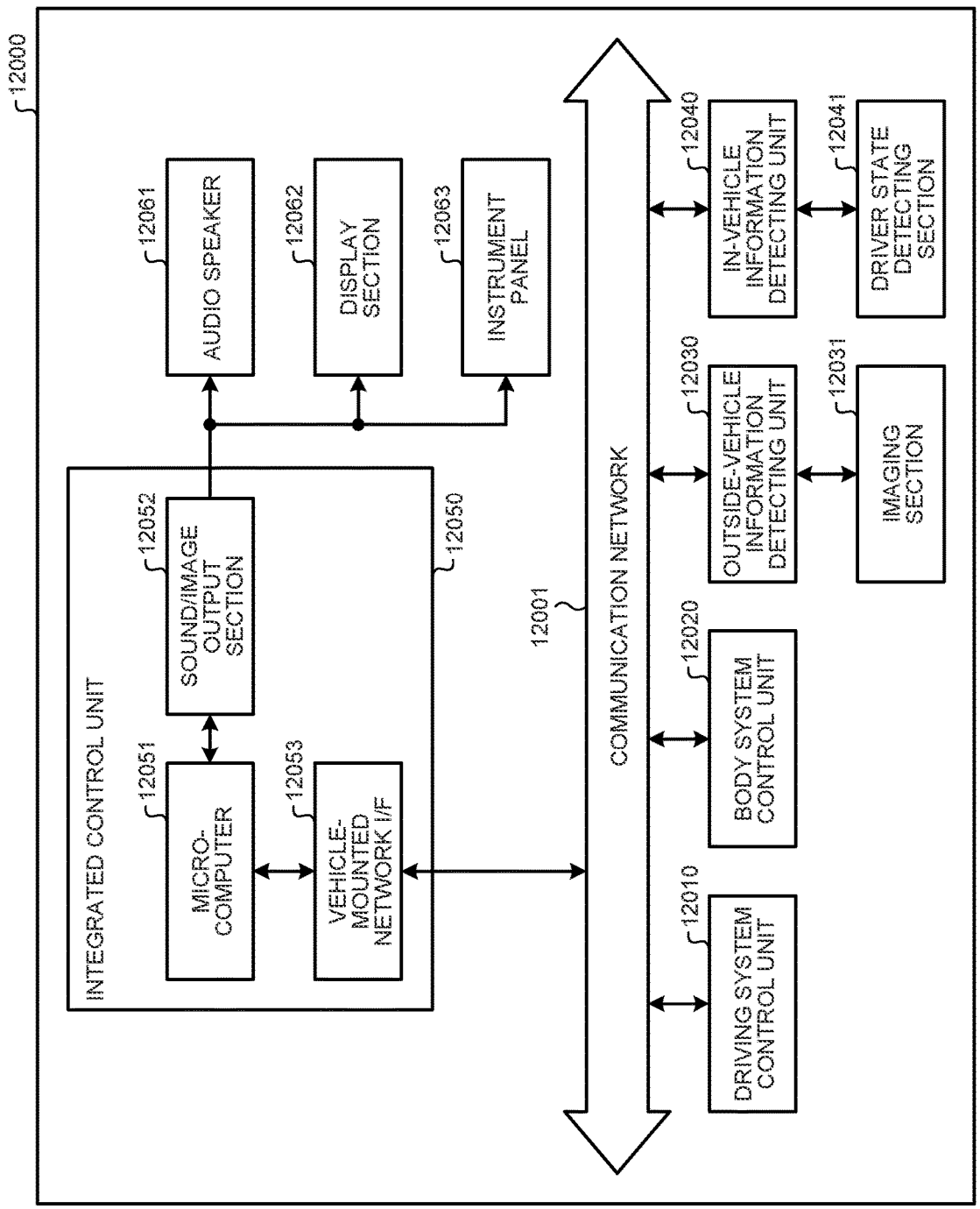
FIG. 17 is a block diagram depicting an example of schematic configuration of a vehicle control system.

FIG. 17 is a block diagram depicting an example of schematic configuration of a vehicle control system as an example of a mobile body control system to which the technology according to an embodiment of the present disclosure can be applied.

A vehicle control system 12000 includes a plurality of electronic control units connected to each other via a communication network 12001. In the example depicted in FIG. 17, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto. For example, the outside-vehicle information detecting unit 12030 performs image processing on the received image and perform object detection processing and distance detection processing based on a result of the image processing.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 17, an audio speaker 12061, a display section 12062, and an instrument panel 12063 are illustrated as the output device. The display section 12062 may, for example, include at least one of an on-board display and a head-up display.

Figure 18:
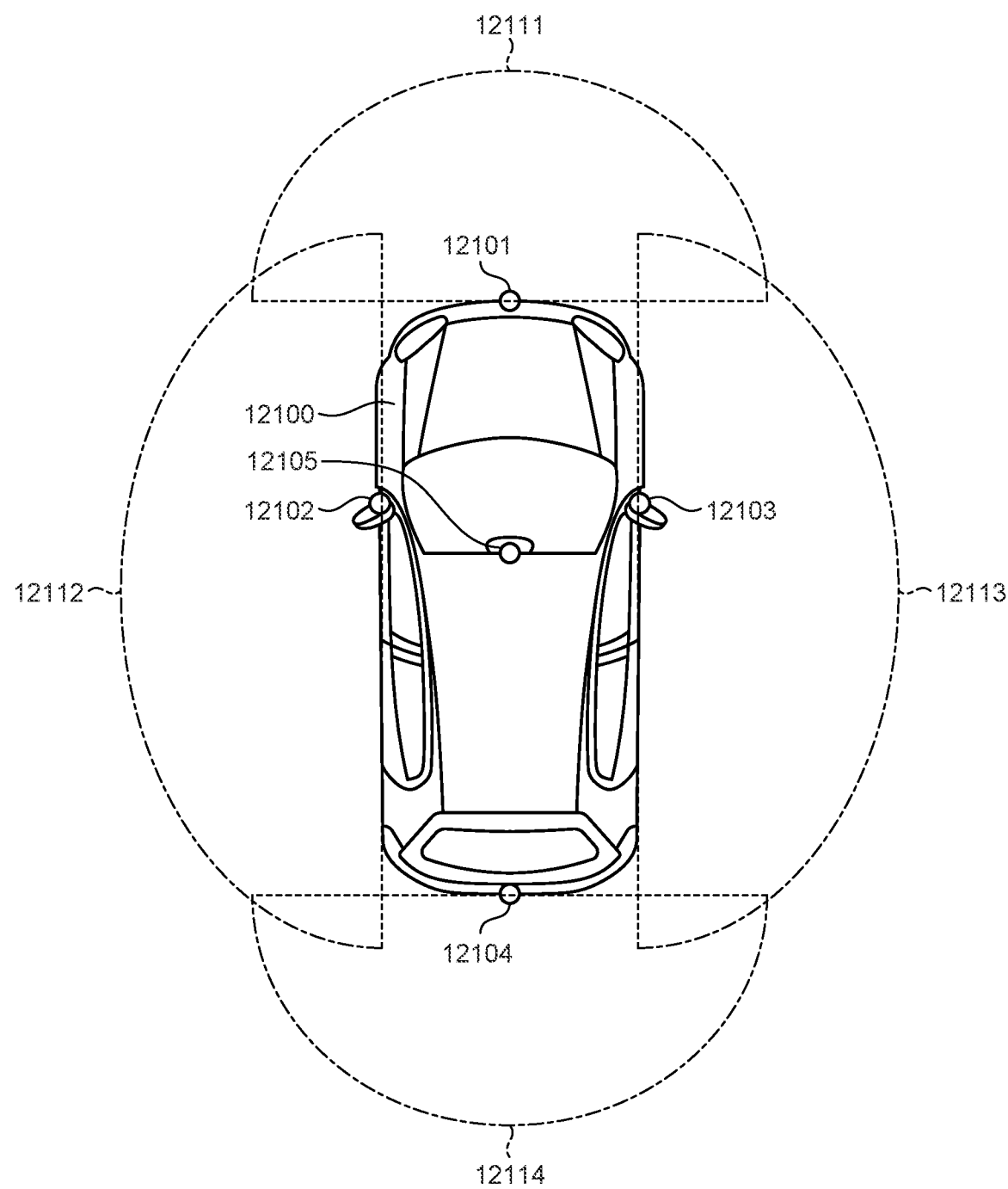
FIG. 18 is a diagram of assistance in explaining an example of installation positions of an outside-vehicle information detecting section and an imaging section.

FIG. 18 is a diagram depicting an example of the installation position of the imaging section 12031. In FIG. 18, a vehicle 12100 includes imaging sections 12101, 12102, 12103, 12104, and 12105 as the imaging section 12031.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The front images acquired by the imaging sections 12101 and 12105 are mainly used for detecting a preceding vehicle, a pedestrian, an obstacle, a traffic light, a traffic sign, a lane, or the like.

Incidentally, FIG. 18 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging sensors, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure may be applied has been described above. The technology according to the present disclosure may be applied to the imaging section 12031 among the configurations described above, for example. Specifically, an imaging device 1 using the imaging sensor 10 to which the above-described first embodiment and modifications thereof and the second embodiment may be applied may be applied to the imaging section 12031. By applying the technology according to the present disclosure to the imaging section 12031, it is possible to increase the exposure time in the imaging sensor 10, to deal with the LED flicker, to reduce noises of intermediate gradation of an image, and to obtain a captured image with higher image quality. This allows the driver to drive more safely.

The effects described in the present specification are merely examples and are not restrictive of the disclosure herein, and other effects may be achieved.

The present technology may also take the following configurations.

(1) An imaging sensor comprising a pixel,
the pixel including:
a first light receiving element and a second light receiving element that generate and accumulate photocharges through photoelectric conversion in accordance with received light; and
an interpixel capacitance that accumulates the photocharges overflowed from the first light receiving element and the second light receiving element during an exposure period, wherein
the second light receiving element has a sensitivity to the light lower than a sensitivity to the light of the first light receiving element.

(2) The imaging sensor according to the above (1), wherein
in the pixel, the first light receiving element includes one or more third light receiving elements having substantially the same size as the second light receiving element.

(3) The imaging sensor according to the above (2), wherein
in the pixel, reading out of photocharges accumulated in the first light receiving element and reading out of photoelectrons accumulated in the second light receiving element are independently controlled.

(4) The imaging sensor according to the above (3), wherein
the pixel includes:
the first light receiving element including two or more of the third light receiving elements; and
the second light receiving element smaller in number than the third light receiving elements.

(5) The imaging sensor according to any one of the above (2) to (4), wherein
the second light receiving element is provided with a neutral density filter on a light receiving surface.

(6) The imaging sensor according to any one of the above (2) to (5), wherein the pixel further includes:
a floating diffusion layer that converts photocharges into a voltage;
a first transistor that transfers the photocharges accumulated in the first light receiving element to the floating diffusion layer;
a second transistor that transfers the photocharges accumulated in the second light receiving element to the floating diffusion layer;
a third transistor that couples and divides a potential of the floating diffusion layer and a potential of the interpixel capacitance; and
a fourth transistor that divides and couples the floating diffusion layer.

(7) The imaging sensor according to the above (6), wherein
the pixel further includes a fifth transistor that transfers the photocharges accumulated in the second light receiving element to the interpixel capacitance.

(8) The imaging sensor according to the above (6) or (7), wherein
the third transistor and the fourth transistor are depletion type transistors.

(9) The imaging sensor according to any one of the above (6) to (8), wherein
the pixel is provided with one of the first transistor for the first light receiving element.

(10) The imaging sensor according to any one of the above (6) to (9), wherein
the pixel is provided with the first transistor with respect to the third light receiving element on a one-to-one basis.

(11) An imaging device comprising:
a pixel, the pixel including
a first light receiving element and a second light receiving element that generate and accumulate photocharges through photoelectric conversion in accordance with received light, and an interpixel capacitance that accumulates the photocharges overflowed from the first light receiving element and the second light receiving element during an exposure period;

a drive unit that drives the pixel; and a recording unit that records a pixel signal output from the pixel based on the photocharges accumulated in the first light receiving element and the second light receiving element, wherein the second light receiving element has a sensitivity to the light lower than a sensitivity to the light of the first light receiving element.

REFERENCE SIGNS LIST

10 IMAGING SENSOR
11 PIXEL ARRAY UNIT
12 VERTICAL DRIVE CIRCUIT
$20_1$, $20_2$, $20_3$, $20_4$, 20S, $20L_1$, $20L_2$, $20L_3$ LIGHT RECEIVING ELEMENT
$21_1$, $21_2$, $21_3$, $21_4$, $21_s$, $21L_1$, $21L_2$, $21L_3$ TRANSFER TRANSISTOR
30 RESET TRANSISTOR
31 CONVERSION EFFICIENCY SWITCHING TRANSISTOR
32 AMPLIFICATION TRANSISTOR
33 SELECTION TRANSISTOR
34 ACCUMULATION TRANSISTOR
35 OFG TRANSISTOR
100, 100a, 100b, 100c UNIT PIXEL
200, 210 SNR CURVE

What is claimed is:

1. An imaging sensor comprising a pixel, the pixel including:
a first light receiving element and a second light receiving element that generate and accumulate photocharges through photoelectric conversion in accordance with received light, wherein the first light receiving element includes a plurality of third light receiving elements;
a floating diffusion layer that converts photocharges into a voltage;
a plurality of first transfer transistors that transfer the photocharges accumulated in the third light receiving elements to the floating diffusion layer;
a second transfer transistor that transfers the photocharges accumulated in the second light receiving element to the floating diffusion layer, wherein the first transfer transistors are all controlled by a first drive signal, and wherein the second transfer transistor is controlled by a second drive signal that is independent of the first drive signal; and
an interpixel capacitance that accumulates the photocharges overflowed from the first light receiving element and the second light receiving element during an exposure period,
wherein the second light receiving element has a sensitivity to the light that is lower than a sensitivity to the light of the third light receiving elements.

2. The imaging sensor according to claim 1, wherein each of the third light receiving elements included in the first light receiving element have substantially a same size as the second light receiving element.

3. The imaging sensor according to claim 2, wherein reading out of photocharges accumulated in the first light receiving element and reading out of photoelectrons accumulated in the second light receiving element are independently controlled.

4. The imaging sensor according to claim 3, further comprising:
a plurality of second light receiving elements, wherein a number of light receiving elements included in the plurality of second light receiving elements is wherein the pixel includes fewer second light receiving elements than third light receiving elements.

5. The imaging sensor according to claim 2, wherein the pixel further includes:
a third transistor that couples and divides a potential of the floating diffusion layer and a potential of the interpixel capacitance; and
a fourth transistor that divides and couples the floating diffusion layer.

6. The imaging sensor according to claim 5, wherein the pixel further includes a fifth transistor that transfers the photocharges accumulated in the second light receiving element to the interpixel capacitance.

7. The imaging sensor according to claim 5, wherein the third transistor and the fourth transistor are depletion type transistors.

8. The imaging sensor according to claim 5, wherein the pixel is provided with one of the first transfer transistors for each of the third light receiving elements.

9. The imaging sensor according to claim 1, wherein the second light receiving element is provided with a neutral density filter on a light receiving surface.

10. An imaging device, comprising:
a pixel, the pixel including:
a first light receiving element and a second light receiving element that generate and accumulate photocharges through photoelectric conversion in accordance with received light, wherein the first light receiving element includes a plurality of third light receiving elements;
a floating diffusion layer that converts photocharges into a voltage;
a plurality of first transfer transistors that transfer the photocharges accumulated in the third light receiving elements to the floating diffusion layer;
a second transfer transistor that transfers the photocharges accumulated in the second light receiving element to the floating diffusion layer, wherein the first transfer transistors are all controlled by a first drive signal, and wherein the second transfer transistor is controlled by a second drive signal that is independent of the first drive signal; and
an interpixel capacitance that accumulates the photocharges overflowed from the first light receiving element and the second light receiving element during an exposure period;
a drive unit that drives the pixel; and
a recording unit that records a pixel signal output from the pixel based on the photocharges accumulated in the first light receiving element and the second light receiving element, wherein
the second light receiving element has a sensitivity to the light that is lower than a sensitivity to the light of the third light receiving elements.

* * * * *